United States Patent
Aikawa

(10) Patent No.: US 10,268,757 B2
(45) Date of Patent: Apr. 23, 2019

(54) PORTFOLIO CREATION SYSTEM

(71) Applicant: Samadhi Co., Ltd, Tokyo (JP)

(72) Inventor: Hideki Aikawa, Tokyo (JP)

(73) Assignee: SAMADHI CO., LTD., Tokyo (JP)

( * ) Notice: Subject to any disclaimer, the term of this patent is extended or adjusted under 35 U.S.C. 154(b) by 124 days.

(21) Appl. No.: 15/325,409

(22) PCT Filed: Feb. 19, 2016

(86) PCT No.: PCT/JP2016/054958
§ 371 (c)(1),
(2) Date: Jan. 10, 2017

(87) PCT Pub. No.: WO2017/141446
PCT Pub. Date: Aug. 24, 2017

(65) Prior Publication Data
US 2018/0173794 A1    Jun. 21, 2018

(51) Int. Cl.
*G06F 17/30* (2006.01)
*H04L 12/58* (2006.01)
(Continued)

(52) U.S. Cl.
CPC ........ *G06F 17/30702* (2013.01); *G06F 21/31* (2013.01); *G06F 21/50* (2013.01); *G06Q 50/20* (2013.01); *H04L 51/04* (2013.01)

(58) Field of Classification Search
CPC .... G06F 17/30702; G06F 21/31; G06F 21/50; H04L 51/04; G06Q 50/20
See application file for complete search history.

(56) References Cited

U.S. PATENT DOCUMENTS 6,874,002 B1    3/2005    Peleus et al.
8,666,871 B1 *  3/2014    Canter .................. G06Q 40/06
                                                            705/35
(Continued)

FOREIGN PATENT DOCUMENTS

CA    2955349 A1    8/2017
JP    2002041679 A  2/2002
(Continued)

OTHER PUBLICATIONS

Examination Report dated Dec. 14, 2017 in corresponding Canadian Patent Application No. 2,955,349, 5 pages.
(Continued)

*Primary Examiner* — Nelson Giddins
(74) *Attorney, Agent, or Firm* — Kim & Stewart LLP

(57) ABSTRACT

Provided is a portfolio creation system capable of accumulating activity records, summarizing the accumulated activity records as a portfolio, and preventing pretension of a third party. The portfolio creation system includes an approval storage table (group user table 211) that stores an approval determined by an adviser who determines approval or disapproval of registration of a user, for each user, an authentication unit that prohibits use of the user who is not given the approval and allows use of an approved user who is given the approval, a user table (205) that stores information relating to the approved user, an activity table (206) that stores the activity record which is a record of an activity of the approved user, an activity record display unit that displays the activity record in a selectable form, and a portfolio creation unit that creates the portfolio based on the information relating to the approved user and the selected activity record.

4 Claims, 31 Drawing Sheets

(51) Int. Cl.
*G06F 21/31* (2013.01)
*G06F 21/50* (2013.01)
*G06Q 50/20* (2012.01)

(56) References Cited

U.S. PATENT DOCUMENTS

| | | | | |
|---|---|---|---|---|
| 2003/0191777 | A1* | 10/2003 | Lumsden | G06F 17/3089 |
| 2004/0107197 | A1* | 6/2004 | Shen | G06F 17/30864 |
| 2004/0143469 | A1* | 7/2004 | Lutz | G06O 10/10 705/321 |
| 2005/0154662 | A1* | 7/2005 | Langenwalter | G06Q 40/00 705/35 |
| 2008/0221963 | A1* | 9/2008 | Altshule | G06Q 50/20 434/350 |
| 2012/0116414 | A1* | 5/2012 | Malcolm Albee | A01K 11/001 606/117 |
| 2013/0137078 | A1 | 5/2013 | Shustorovich et al. | |
| 2014/0032649 | A1* | 1/2014 | Saedy | H04L 67/10 709/203 |
| 2014/0052658 | A1* | 2/2014 | Wehrle | G06Q 10/1053 705/321 |
| 2014/0289084 | A1* | 9/2014 | Terrell, II | G06Q 40/00 705/35 |
| 2015/0066612 | A1* | 3/2015 | Karpoff | G06Q 50/20 705/14.4 |
| 2015/0348165 | A1 | 12/2015 | Kuroki et al. | |
| 2017/0011463 | A1* | 1/2017 | Pizzi | G06Q 40/06 |
| 2017/0235848 | A1* | 8/2017 | Van Dusen | H04L 41/04 705/12 |

FOREIGN PATENT DOCUMENTS

| | | | |
|---|---|---|---|
| JP | 2002205823 | A | 7/2002 |
| JP | 2003-030570 | A | 1/2003 |
| JP | 2003030570 | A | 1/2003 |
| JP | 2003-132154 | A | 5/2003 |
| JP | 2003132154 | A | 5/2003 |
| JP | 2004157783 | A | 6/2004 |
| JP | 2006113803 | A | 4/2006 |
| JP | 2008112258 | A | 5/2008 |
| JP | 2008147874 | A | 6/2008 |
| JP | 2009110241 | A | 5/2009 |
| JP | 2009-211161 | A | 9/2009 |
| JP | 2009211161 | A | 9/2009 |
| JP | 2009230593 | A | 10/2009 |
| JP | 2015176519 | A | 10/2015 |
| JP | 2015-228193 | A | 12/2015 |
| JP | 2015228193 | A | 12/2015 |
| JP | 6028123 | B1 | 11/2016 |
| JP | 2017146960 | A | 8/2017 |
| JP | 6266717 | B2 | 1/2018 |
| RU | 2494451 | C1 | 9/2013 |
| WO | 2004049143 | A1 | 6/2004 |
| WO | 2012116414 | A1 | 9/2012 |

OTHER PUBLICATIONS

Notification of Reason of Refusal dated Oct. 24, 2017 in corresponding Japanese Patent Application No. 2016-167851 (Japanese Patent No. 6266717) with English translation, 9 pages.
Decision of Refusal and Decision to Dismiss the Amendment dated Mar. 13, 2018 in corresponding Japanese Patent Application No. 2016-232043 (Japanese Publication No. 2017-146960) with English translation, 10 pages.
Notification of Reason for Refusal dated Dec. 12, 2017 in corresponding Japanese Patent Application No. 2016-232043 (Japanese Publication No. 2017-146960) with English translation, 8 pages.
Notification of Reason for Refusal dated Oct. 24, 2017 in corresponding Japanese Patent Application No. 2016-232043 (Japanese Publication No. 2017-146960) with English translation, 8 pages.
Notification of Reason of Refusal dated May 24, 2016 in corresponding Japanese Patent Application No. 2016-513553 (Japanese Patent No. 6028123) with English translation, 7 pages.
Notification of Reason of Refusal dated Aug. 16, 2016 in corresponding Japanese Patent Application No. 2016-513553 (Japanese Patent No. 6028123) with English translation, 9 pages.
Search Report and Written Opinion dated Oct. 23, 2017 in corresponding Singapore Patent Application No. 11201700391W, 11 pages.
Response to Written Opinion electronically filed Jan. 30, 2018 in corresponding Singapore Patent Application No. 11201700391W, 18 pages.
International Search Report dated Feb. 19, 2016 in PCT Patent Application PCT/JP2016/054958 with English translation of relevant portions.
English Translation of the Written Opinion of the International Searching Authority dated May 24, 2016 in PCT Patent Application PCT/JP2016/054958.
International Search Report dated May 24, 2016 in PCT Patent Application PCT/JP2016/054958 with English Translation of relevant portions.
International Search Report, PCT/JP2016/054958, untranslated.
Extended European Search Report dated Apr. 9, 2018, mailed in counterpart European Application No. 16828700.1, 8 pages.
Supplementary European Search Report dated Apr. 30, 2018, mailed in counterpart European Application No. 16828700.1, 1 page.
Russian Office Action dated May 7, 2018, filed in Russian counterpart Application No. 2017111344, 13 pages (with translation).
Australian Office Action dated Jan. 31, 2018 (Examination Report No. 1), filed in Australian counterpart Application No. 2016340293, 5 pages.
Response filed on Apr. 12, 2018 to Australian Office Action dated Jan. 31, 2018, filed in Australian counterpart Application No. 2016340293, 9 pages.
Australian Office Action dated May 7, 2018 (Examination Report No. 2), filed in Australian counterpart Application No. 2016340293, 4 pages.

* cited by examiner

Fig.2

OPERATOR TABLE

| OPERATOR ID |
|---|
| OPERATOR NAME |
| ADDRESS |
| : |

Fig.3

ORGANIZATION TABLE

| ORGANIZATION ID |
|---|
| ORGANIZATION NAME |
| ADDRESS |
| : |

Fig.4

ORGANIZATION USER TABLE

| ORGANIZATION ID |
|---|
| USER ID |
| : |

Fig.5

GROUP TABLE

| ORGANIZATION ID |
|---|
| GROUP ID |
| GROUP NAME |
| : |

Fig.6

USER TABLE

| USER ID |
|---|
| USER TYPE |
| PASSWORD |
| E-MAIL ADDRESS |
| ORGANIZATION ID |
| NAME |
| ADDRESS |
| BIRTHDAY |
| : |

Fig.7

ACTIVITY TABLE

| USER ID |
|---|
| ACTIVITY RECORD SERIAL NUMBER |
| TAG |
| TITLE |
| TEXT |
| DEGREE OF IMPORTANCE |
| IMAGE |
| ATTACHMENT FILE |
| VIDEO URL |
| DATE |
| DISCLOSURE RANGE |
| : |

Fig.8

ACTIVITY COMMENT TABLE

| USER ID |
|---|
| ACTIVITY RECORD SERIAL NUMBER |
| COMMENT NUMBER |
| USER ID OF COMMENT WRITER |
| COMMENT CONTENT |
| DATE |
| : |

Fig.9

ACTIVITY EVALUATION TABLE

| USER ID |
|---|
| ACTIVITY RECORD SERIAL NUMBER |
| GOOD EVALUATION USER ID |
| DATE |
| : |

Fig.10

FOLLOW TABLE

| FOLLOWED USER ID |
|---|
| FOLLOWING USER ID |
| : |

Fig.11

ADVISER TABLE

| ORGANIZATION ID |
| --- |
| GROUP ID |
| ADVISER ID |
| ADVISER NAME |
| ADVISER E-MAIL ADDRESS |
| : |

Fig.12

GROUP USER TABLE

| ORGANIZATION ID |
| --- |
| GROUP ID |
| USER ID |
| APPROVAL STATUS |
| APPROVAL ADVISER ID |
| : |

Fig.13

PORTFOLIO TABLE

| USER ID |
| --- |
| PORTFOLIO NUMBER |
| PORTFOLIO NAME |
| PORTFOLIO DISPLAY ORDER |
| REGISTRATION DATE |
| UPDATED DATE |
| : |

Fig.14

PORTFOLIO COMMENT TABLE

| USER ID |
| --- |
| PORTFOLIO NUMBER |
| COMMENT NUMBER |
| COMMENT WRITER ID |
| COMMENT |
| REGISTRATION DATE |
| UPDATED DATE |
| : |

Fig.15

PORTFOLIO EVALUATION TABLE

| USER ID |
| --- |
| PORTFOLIO NUMBER |
| GOOD EVALUATION USER ID |
| DATE |
| : |

Fig.16

TASK TABLE

| USER ID |
| --- |
| TASK YEAR |
| TASK SERIAL NUMBER |
| ORGANIZATION ID |
| GROUP YEAR |
| GROUP ID |
| TASK TITLE |
| TASK SETTER USER ID |
| TASK TRANSMISSION DESTINATION USER ID |
| TASK TEXT |
| TASK ATTACHMENT FILE |
| TASK SUBMISSION PERIOD |
| TRANSMISSION DATE AND TIME SETTING FLAG |
| TRANSMISSION PERIOD |
| DATE |
| : |

Fig.17

TASK RECEPTION TABLE

| USER ID |
|---|
| TASK YEAR |
| TASK SERIAL NUMBER |
| TASK SETTER USER ID |
| TASK TRANSMISSION DESTINATION USER ID |
| DATE |
| : |

Fig.18

TASK REPLY TABLE

| TASK SETTER USER ID |
|---|
| TASK YEAR |
| TASK SERIAL NUMBER |
| SUBMITTER USER ID |
| TASK REPLY CONTENT |
| REPLY ATTACHMENT FILE |
| SUBMISSION DATE |
| : |

Fig.19

CHAT ROOM TABLE

| ROOM NUMBER |
|---|
| CREATOR USER ID |
| REGISTRATION DATE |
| UPDATED DATE |
| : |

ROOM MEMBER TABLE

| ROOM NUMBER |
|---|
| PATICIPANT USER ID |
| SERIAL NUMBER |
| REGISTRATION DATE |
| UPDATED DATE |
| : |

Fig.20

CHAT MESSAGE TABLE

| ROOM NUMBER |
|---|
| MESSAGE NUMBER |
| CONTRIBUTOR USER ID |
| MESSAGE |
| PHOTO |
| REGISTRATION DATE |
| UPDATED DATE |
| : |

PORTFOLIO CREATION SYSTEM

TECHNICAL FIELD

The present invention relates to a portfolio creation system.

BACKGROUND ART

In a college entrance examination, a so-called admission office (AO) entrance examination has been spread. In the AO entrance examination, evaluation is not performed based on results of paper tests, but is performed based on a personality and an aptitude of an applicant based on a written report, an activity report about activities inside and outside a school, reasons for choice, an interview, an essay, or the like, and a pass or failure is determined by comparing the applicant with student resources sought by a college.

Here, the activity report refers to a summary of records of activities inside and outside a school for several years, and is also referred to as a portfolio. Such a portfolio may not be necessary for only Japanese colleges, but also for overseas colleges, and formats thereof may be determined according to colleges.

When such a portfolio is created, the following problems arise.

First, even when trying to create a portfolio for a college entrance examination, there may be no record of details of previous activities and the memory may be ambiguous. In this case, although an examinee has activities to be evaluated by a college, it is not easy to summarize the activities as a portfolio.

Second, if formats required by colleges are changed according to colleges, it is necessary to prepare portfolios of different formats in order to apply to plural colleges, which takes a lot of efforts.

Third, in a case where a format determined by a college is strict, it is not easy to prepare a portfolio according to the format.

Regarding these points, in particular, when college students do job searching, a system in which information to be written in a resume, records of activities inside and outside a school, and the like are stored in a database, the stored content is output in formats of resumes or various reports, and the created resume is disclosed on a predetermined site has been proposed (for example, PTL 1).

According to this technique, efforts for preparing resumes or the like are reduced, but a problem of "identity theft" newly occurs. In other words, a person who does not exist or a third party may pretend to be a different person, and may arbitrarily create a resume of the person who does not exist or the different person.

Regarding this point, a system has been proposed in which a document for confirming a host user together with information on a resume is mailed to a third party organization in advance, the third party organization registers the information in a database, data transmitted later and resume data registered in advance are collated with each other when the user creates a resume, and the host user is authenticated in a case where the degree of coincidence is high (for example, PTL 2).

However, even using this technique, in a case where a third party pretends to be a different person from the beginning, it is not possible to prevent a resume or the like from being created by pretension of the third party.

CITATION LIST

Patent Literature

[PTL 1] JP-A-2003-132154
[PTL 2] JP-A-2005-190452

SUMMARY OF INVENTION

Technical Problem

In consideration of the above-mentioned problems, an object of the invention is to provide a portfolio creation system capable of accumulating activity records of a host user by a simple operation, easily summarizing the accumulated activity records as a portfolio, and preventing pretension of a third party.

Solution to Problem

According to an aspect of the invention, there is provided a portfolio creation system comprising: an approval storage table that stores an approval determined by an adviser who determines approval or disapproval of registration of a user, for each user; an authentication unit that prohibits use of the user who is not given the approval and allows use of an approved user who is given the approval; a user table that stores information relating to the approved user; an activity table that stores the activity record which is a record of an activity of the approved user; an activity record display unit that displays the activity record in a selectable form; and a portfolio creation unit that creates the portfolio based on the information relating to the approved user and the selected activity record.

Advantageous Effects of Invention

According to the invention, it is possible to provide a portfolio creation system capable of accumulating activity records of a host user by a simple operation, easily summarizing the accumulated activity records as a portfolio, and preventing pretension of a third party.

BRIEF DESCRIPTION OF DRAWINGS

FIG. 2 is a diagram illustrating a data configuration of an operator table.

FIG. 3 is a diagram illustrating a data configuration of an organization table.

FIG. 4 is a diagram illustrating a data configuration of an organization user table.

FIG. 5 is a diagram illustrating a data configuration of a group table.

FIG. 6 is a diagram illustrating a data configuration of a user table.

FIG. 7 is a diagram illustrating a data configuration of an activity table.

FIG. 8 is a diagram illustrating a data configuration of an activity comment table.

FIG. 9 is a diagram illustrating a data configuration of an activity evaluation table.

FIG. 10 is a diagram illustrating a data configuration of a follow table.

FIG. 11 is a diagram illustrating a data configuration of an adviser table.

FIG. 12 is a diagram illustrating a data configuration of a group user table.

FIG. 13 is a diagram illustrating a data configuration of a portfolio table.

FIG. 14 is a diagram illustrating a data configuration of a portfolio comment table.

FIG. 15 is a diagram illustrating a data configuration of a portfolio evaluation table.

FIG. 16 is a diagram illustrating a data configuration of a task table.

FIG. 17 is a diagram illustrating a data configuration of a task reception table.

FIG. 18 is a diagram illustrating a data configuration of a task reply table.

FIG. 19 is a diagram illustrating data configurations of a chat room table and a room member table.

FIG. 20 is a diagram illustrating a data configuration of a chat message table.

DESCRIPTION OF EMBODIMENTS

Hereinafter, an embodiment of a portfolio creation system of the invention will be described with reference to the accompanying drawings. Embodiments described below are only examples, and appropriate configurations may be added or omitted.

(System Configuration)

Figure 1:
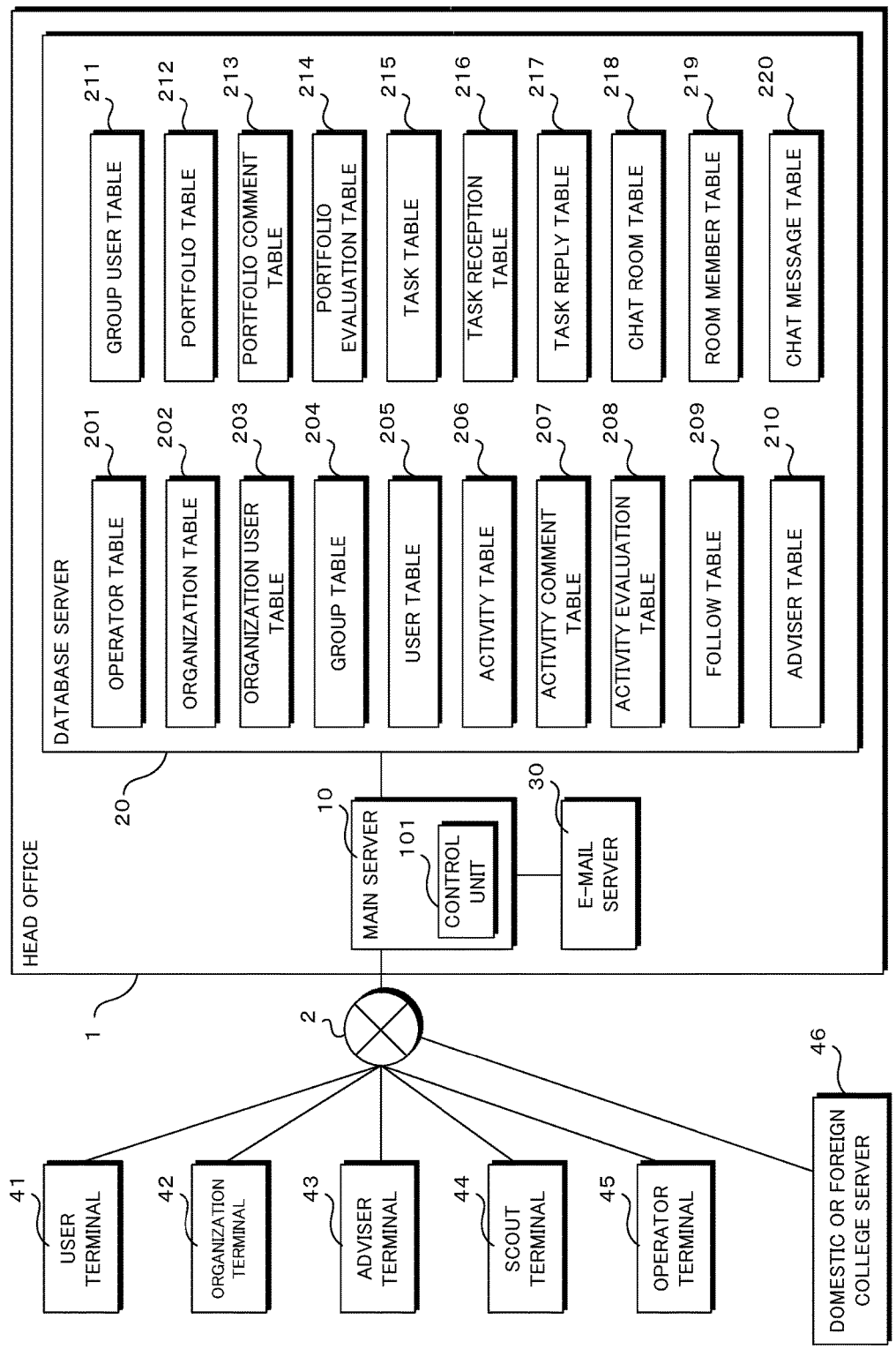
FIG. 1 is a block diagram illustrating a system configuration of a portfolio creation system.

FIG. 1 is a diagram illustrating a system configuration of a portfolio creation system of the present embodiment. As shown in FIG. 1, the portfolio creation system includes a main server 10 which is provided in a head office 1 or a cloud service provider, a database server 20, and an e-mail server 30.

The main server 10 includes a control unit 101 including a central processing unit (CPU) which is an arithmetic unit, a storage unit including a storage device such as a memory or a hard disk drive, and a communication unit that performs communication.

The control unit 101 reads a portfolio creation program from the storage unit, and sequentially executes the portfolio creation program. Here, the portfolio creation program may be stored in the storage device of the main server 10, may be stored in a separate storage device on a cloud, or may be stored on a removable recording medium such as a DVD-ROM.

The communication unit is connected to the Internet 2 which is a public communication network through a provider. In a case where the main server 10 is provided in a school, the main server 10 may be connected to a LAN in the school.

The database server 20 stores a table group including an operator table 201, an organization table 202, an organization user table 203, a group user table 211, a user table 205, an activity table 206, an activity comment table 207, an activity evaluation table 208, a follow table 209, an adviser table 210, a group user table 211, a portfolio table 212, a portfolio comment table 213, a task table 215, a task reception table 216, a task reply table 217, a chat room table 218, a room member table 219, and a chat message table 220.

The message server 30 stores transmitted and received e-mails, and performs e-mail transmission and reception through a LAN or the Internet 2.

A user terminal 41 possessed by a user, an organization terminal 42 disposed in an organization such as a school, an adviser terminal 43 possessed by a supervisor called an adviser, a scout terminal 44 possessed by a person who scouts a student, an operator terminal 45 possessed by an operator of a portfolio creation system, and a college server 46 provided in domestic or international colleges are connected to the main server 10 through the Internet 2.

The user terminal 41, the organization terminal 42, the adviser terminal 43, the scout terminal 44, and the operator terminal 45 may be a so-called personal computer, a so-called a tablet terminal, or a smartphone.

FIG. 2 is a diagram illustrating a data configuration of the operator table 201. As shown in FIG. 2, the operator table 201 stores information about an operator of a system. Specifically, the operator table 201 stores an operator ID which is an identifier uniquely allocated to an operator, an operator name which is a name of the operator, and an address which is an address of the operator.

FIG. 3 is a diagram illustrating a data configuration of the organization table 202. As shown in FIG. 3, the organization table 202 stores information about a school such as a high school or a college, a preparatory school, and a different organization which is a corporation or an association. Specifically, the organization table 202 stores an organization ID which is an identifier uniquely allocated to an organization, an organization name which is a name of the organization, and an address which is an address of the organization.

FIG. 4 is a diagram illustrating a data configuration of the organization user table 203. As shown in FIG. 4, the organization user table 203 stores information about users such as pupils or students who belong to an organization. Specifically, the organization user table 203 stores user IDs which are identifiers uniquely allocated to users for each organization ID.

FIG. 5 is a diagram illustrating a data configuration of the group table 204. As shown in FIG. 5, the group table 204 stores information about groups which belong to an organization. Here, the groups correspond to classes in a case where the organization is a high school. Specifically, the group table 204 stores group IDs uniquely allocated to groups for each organization ID, and group names which are names of the groups.

FIG. 6 is a diagram illustrating a data configuration of the user table 205. As shown in FIG. 6, the user table 205 stores information about each user for each user. Specifically, the user table 205 stores a user ID, a user type which is the type of a user, a password to be used in log-in, an organization ID indicating an organization to which the user belongs, a name of the user, and an address of the user, and a birthday of the user.

Here, the type of the user includes an "organization" indicating a school in a case where the organization is a high school, an "adviser" indicating a leader such as a teacher, a "general user" indicating a pupil, and the like.

FIG. 7 is a diagram illustrating a data configuration of the activity table 206. As shown in FIG. 7, the activity table 206 stores content of activities of a general user inside and outside a school for each user ID. Specifically, the activity table 206 stores a user ID, an activity record serial number which is a serial number allocated to each activity record, a tag, a title of the activity record, a text for describing activity content, the degree of importance, an image such as an activity photo, an attachment file such as a report, a video URL which is a URL of a video contributed to a video site, a recorded date, and a disclosure range.

The degree of importance represents a ranking from 1 to 5 rated by a user.

The tag indicates a keyword that directly represents an activity record.

The disclosure range refers to a range where an activity record is disclosed. For example, the disclosure range is selected from "only me", "only members of a group (class)", "only members of an organization (school)", and "all the world (disclosed on the Internet)".

FIG. 8 is a diagram illustrating a data configuration of the activity comment table 207. As shown in FIG. 8, the activity comment table 207 stores a comment given to each activity record serial number for each user ID. Specifically, the activity comment table 207 stores a user ID, an activity record serial number, a comment number which is a comment serial number, a user ID of a comment writer, comment content indicating content of the comment, and a date indicating a date on which the comment is added.

FIG. 9 is a diagram illustrating a data configuration of the activity evaluation table 208. As shown in FIG. 9, the activity evaluation table 208 stores a good evaluation user ID which is a user ID of a user who shows a good evaluation for each activity record serial number, and a date indicating a date on which the number of good evaluation users is summed.

FIG. 10 is a diagram illustrating a data configuration of the follow table 209. As shown in FIG. 10, the follow table 209 stores information about a following person and a followed person. Specifically, the follow table 209 stores a followed user ID and a following user ID.

FIG. 11 is a diagram illustrating a data configuration of the adviser table 210. As shown in FIG. 11, the adviser table 210 stores information about an adviser. Specifically, the adviser table 210 stores a group ID, an adviser ID which is an identifier uniquely allocated to an adviser, an adviser name which is a name of the adviser, and an adviser e-mail address which is an e-mail address of the adviser.

FIG. 12 is a diagram illustrating a data configuration of the group user table 211. As shown in FIG. 12, the group user table 211 which is an approval storage table stores approval or disapproval of registration of a general user into a system. Specifically, the group user table 211 stores an organization ID, a group ID, a user ID, an approval status indicating approval or disapproval of registration into a system, and an approval adviser indicating an adviser who gives an approval.

FIG. 13 is a diagram illustrating a data configuration of the portfolio table 212. As shown in FIG. 13, the portfolio table 212 stores information about a portfolio for each user ID. Specifically, the portfolio table 212 stores a user ID, a portfolio number which is an identifier allocated to a portfolio by a user, a portfolio name which is a name given to the portfolio by the user, a portfolio display order indicating a display order of activity records in a portfolio, a portfolio registration date, and a portfolio updated date.

FIG. 14 is a diagram illustrating a data configuration of the portfolio comment table 213. As shown in FIG. 14, the portfolio comment table 213 stores a comment made by another user for each portfolio. Specifically, the portfolio comment table 213 stores a user ID, a portfolio number, a comment number which is sequentially allocated to a comment, a comment writer ID indicating a user ID of a user who writes the comment, a comment indicating content of the comment, a comment registration date, and a comment updated date.

FIG. 15 is a diagram illustrating a data configuration of the portfolio evaluation table 214. As shown in FIG. 15, the portfolio evaluation table 214 stores information about another user who shows a good evaluation for each portfolio. Specifically, the portfolio evaluation table 214 stores a user ID, a portfolio number, a good evaluation user ID which is a user ID of a user who shows a good evaluation, and an evaluation date.

FIG. 16 is a diagram illustrating a data configuration of the task table 215. As shown in FIG. 16, the task table 215 stores information about a task. Specifically, the task table 215 stores a user ID, a task year indicating a year when a task is given, a task serial number uniquely allocated to the task, an organization ID, a group year indicating the year of a group, a group ID, a task title which is a title of the task, a task setter user ID, a task transmission destination user ID indicating a user ID of a submission destination of the task, a task text indicating content of the task, a task attachment file indicating a file attached to the task, a task submission period which is a submission period of the task, a transmission date and time setting flag indicating that a transmission date and time is designated, a transmission period which is a period during which the task is transmitted to a user, and a registration date.

Here, the transmission date setting flag refers to a flag indicating that a task is transmitted to a user from a portfolio creation system in a designated period, in its ON state.

FIG. 17 is a diagram illustrating a data configuration of the task reception table 216. As shown in FIG. 17, the task reception table 216 stores reception content of a task received from a task setter. Specifically, the task reception table 216 stores a user ID, a task year, a task serial number, a task setter user ID, a task transmission destination user ID, and a date.

FIG. 18 is a diagram illustrating a data configuration of the task reply table 217. As shown in FIG. 18, the task reply table 217 stores a reply of a task transmitted by a user. Specifically, the task reply table 217 stores a task setter user ID, a task year, a task serial number, a submitter user ID, a task reply content indicating content of a reply to a task, a reply attachment file indicating a file attached to the reply, and a submission date.

FIG. 19 is a diagram illustrating a data configuration of the chat room table 218 and the room member table 219. As shown in FIG. 19, the chat room table 218 stores information about a chat room which is a virtual space for message exchange in a chat-form message exchange function which is included in a portfolio creation system. Specifically, the chat room table 218 stores a room number which is an identifier of a room which is a virtual space for message exchange, a creation user ID indicating a user ID of a user who creates a room, a registration date, and an updated date. The room member table 219 stores a participant user ID indicating a user ID of a user who participates in a room, a serial number allocated to a participant user, a registration date, and an updated date.

FIG. 20 is a diagram illustrating a data configuration of the chat message table 220. As shown in FIG. 20, the chat message table 220 stores content of messages exchanged in a room. Specifically, the chat message table 220 stores a room number, a message number uniquely allocated to a message, a user ID of a contributor of the message, messages, a contributed photo, a registration date, and an updated date.

Data stored in the above-described each table is only an example, and thus, appropriate additions and omissions may be made thereto.

(Operation of System)

Hereinafter, an operation of the control unit 101 of the main server 10 of the portfolio creation system will be described.

(Main Process)

Figure 21:
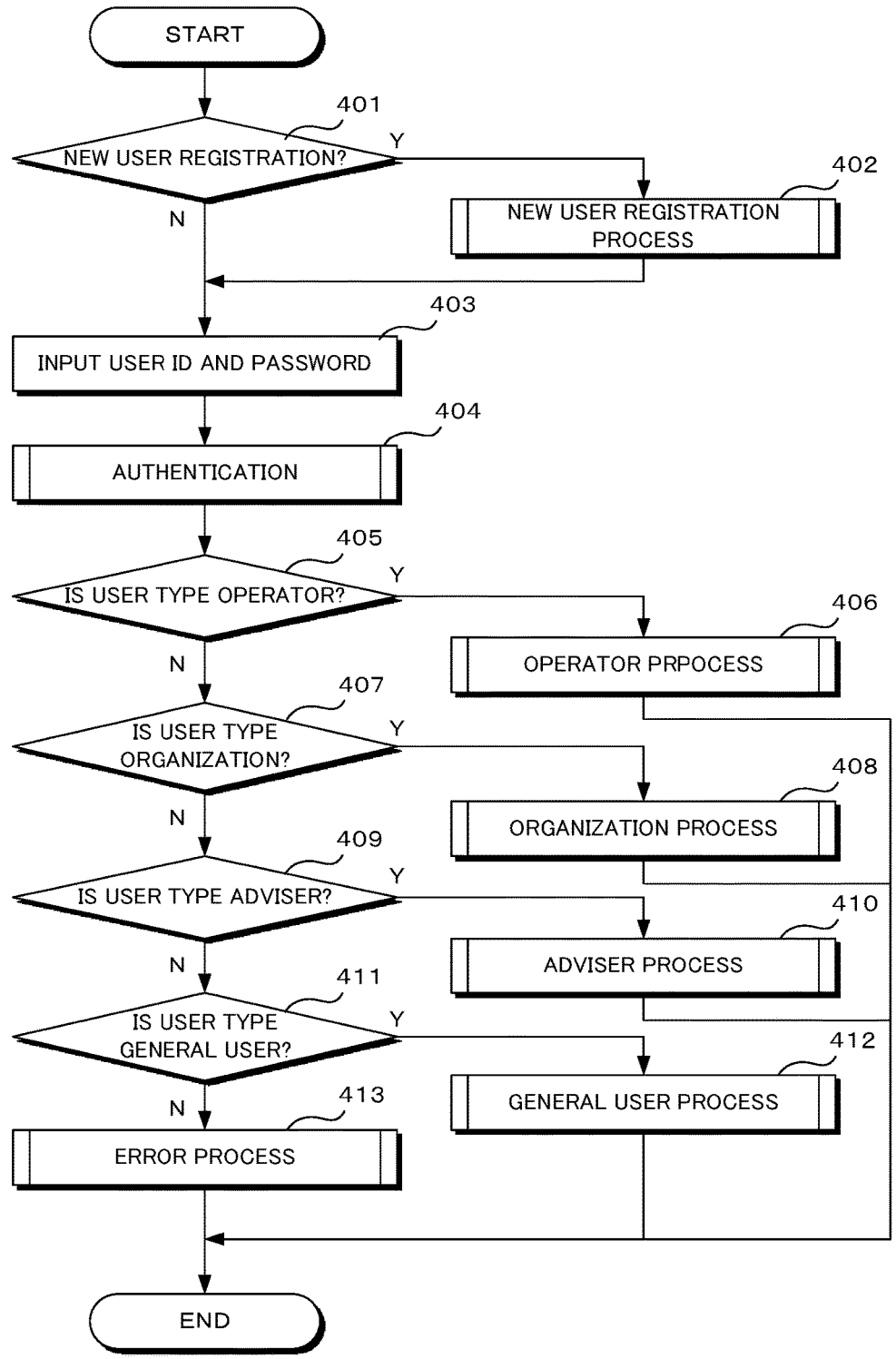
FIG. 21 is a flowchart illustrating an operation of a main process.

FIG. 21 is a flowchart illustrating an operation of a main process. As shown in FIG. 21, in step 401, the control unit 101 displays a log-in screen on a display unit of an accessing terminal. Further, the control unit 101 determines whether registration of a new user is instructed on the log-in screen. In a case where it is determined that the registration of the new user is instructed (Y in step 401), the control unit 101 causes the procedure to proceed to step 402, and in a case where it is determined that the registration of the new user is not instructed (N in step S401), the control unit 101 causes the procedure to proceed to step 403.

In step 402, the control unit 101 executes a new user registration process, and then, causes the procedure to proceed to step 403.

In step 403, the control unit 101 causes a user to input a user ID and a password.

In step 404, the control unit 101 retrieves the user table 205 based on the input user ID, and reads a password. In a case where the read password matches the input password and an approval status read from the group user table 211 based on the user ID is "approved", it is determined that authentication is successful, the control unit 101 causes the procedure to proceed to step 404. In a case where the read password does not coincide with the input password, the control unit 101 outputs an error message. An authentication function of the main process is referred to as an authentication unit.

In step 405, the control unit 101 reads a user type from the user table 205 based on the user ID. In a case where it is determined that the user type is an "operator" (Y in step 405), the control unit 101 causes the procedure to proceed to step 406, and in a case where it is determined that the user type is not the "operator" (N in step 405), the control unit 101 causes the procedure to proceed to step 407.

In step 406, the control unit 101 executes an operator process, and terminates the process.

In step 407, in a case where it is determined that the user type is an "organization" (Y in step 407), the control unit 101 causes the procedure to proceed to step 408, and in a case where it is determined that the user type is not the "organization" (N in step 407), the control unit 101 causes the procedure to proceed to step 409.

In step 408, the control unit 101 executes an organization process, and terminates the process.

In step 409, in a case where it is determined that the user type is an "adviser" (Y in step 409), the control unit 101 causes the procedure to proceed to step 410, and in a case where it is determined that the user type is not the "adviser" (N in step 409), the control unit 101 causes the procedure to proceed to step 411.

In step 410, the control unit 101 executes an adviser process, and terminates the process.

In step 411, in a case where it is determined that the user type is a "general user" (Y in step 411), the control unit 101 causes the procedure to proceed to step 412, and in a case where it is determined that the user type is not the "general user" (N in step 411), the control unit 101 causes the procedure to proceed to step 413.

In step 412, the control unit 101 executes a general user process, and terminates the process.

In step 413, the control unit 101 executes an error process, and terminates the procedure.

(Operator Process)

Figure 22:
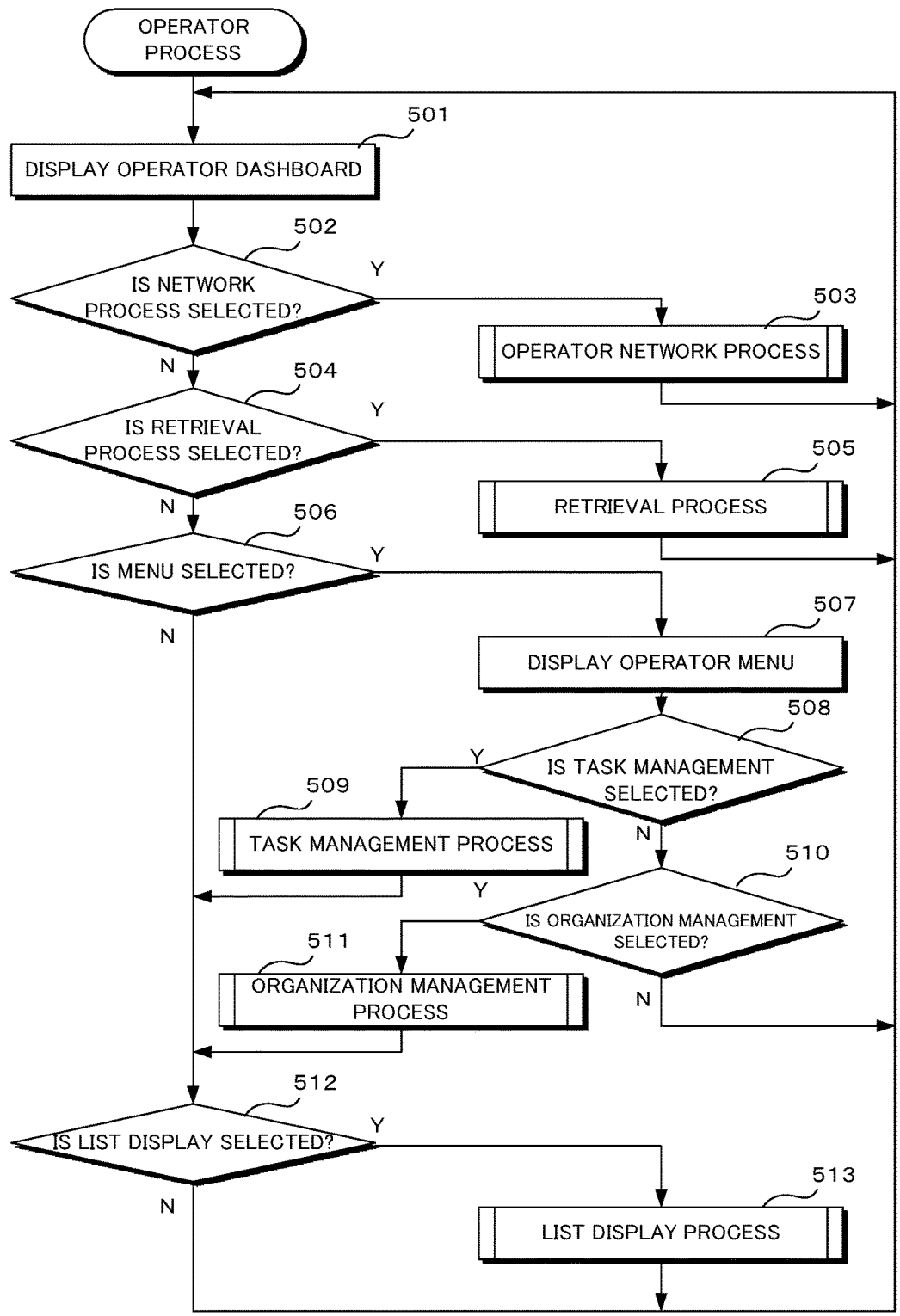
FIG. 22 is a flowchart illustrating an operation of an operator process.

FIG. 22 is a flowchart illustrating an operation of an operator process. As shown in FIG. 22, in step 501, the control unit 101 displays an operator dashboard on a display unit of the operator terminal 45.

In step 502, the control unit 101 determines whether a network process is selected by a user. In a case where it is determined that the network process is selected (Y in step 502), the control unit 101 causes the procedure to proceed to step 503, and in a case where it is determined that the network process is not selected (N in step 502), the control unit 101 causes the procedure to proceed to step 504.

In step 503, the control unit 101 executes an operator network process, and then, causes the procedure to return to step 501.

In step 504, the control unit 101 determines whether a retrieval process is selected by a user. In a case where it is determined that the retrieval process is selected (Y in step 504), the control unit 101 causes the procedure to proceed to step 505, and in a case where it is determined that the retrieval process is not selected (N in step 504), the control unit 101 causes the procedure to proceed to step 506.

In step 505, the control unit 101 executes the retrieval process, and then, causes the procedure to return to step 501.

In step 506, the control unit 101 determines whether a menu is selected. In a case where it is determined that the menu is selected (Y in step 506), the control unit 101 causes the procedure to proceed to step 507, and in a case where it is determined that the menu is not selected (N in step 506), the control unit 101 causes the procedure to proceed to step 512.

In step 507, the control unit 101 displays an operator menu.

In step 508, the control unit 101 determines whether a task management is selected. In a case where it is determined that the task management is selected (Y in step 508), the control unit 101 causes the procedure to proceed to step 509, and in a case where it is determined that the task management is not selected (N in step 508), the control unit 101 causes the procedure to proceed to step 510.

In step 509, the control unit 101 executes a task management process, and then, causes the procedure to proceed to step 512.

In step 510, the control unit 101 determines whether an organization management is selected. In a case where it is determined that the organization management is selected (Y in step 510), the control unit 101 causes the procedure to proceed to step 511, and in a case where it is determined that the organization management is not selected (N in step 510), the control unit 101 causes the procedure to return to step 501.

In step 511, the control unit 101 executes an organization management process, and then, causes the procedure to proceed to step 512.

In step 512, the control unit 101 determines whether a list display is selected. In a case where it is determined that the list display is selected (Y in step 512), the control unit 101 causes the procedure to proceed to step 513, and in a case where it is determined that the list display is not selected (N in step 512), the control unit 101 causes the procedure to return to step 501.

In step 513, the control unit 101 executes a list display process, and then, causes the procedure to return to step 501.

Figure 23:
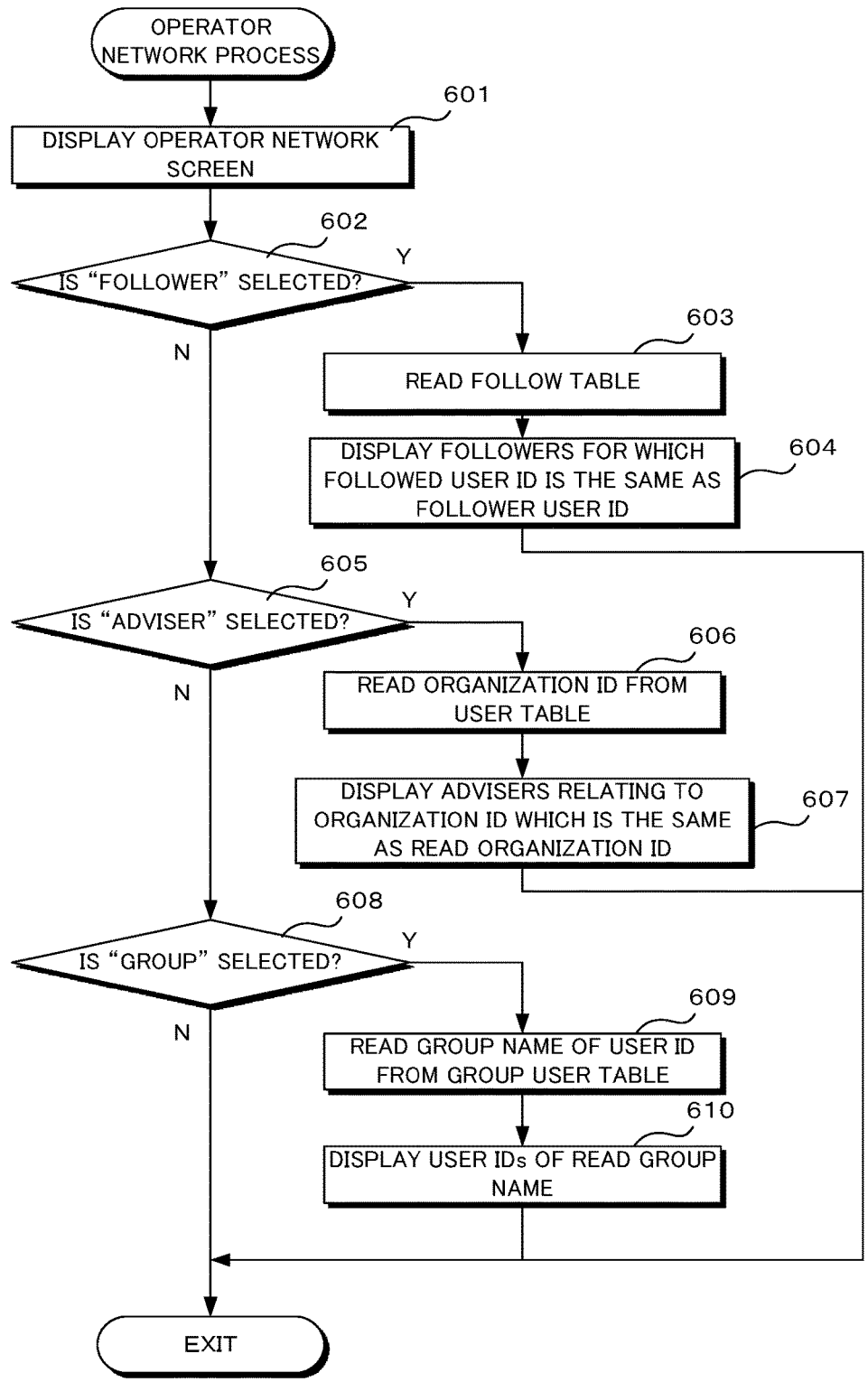
FIG. 23 is a flowchart illustrating an operation of an operator network process.

FIG. 23 is a flowchart illustrating an operation of an operator network process. Here, a network means a social network between people. In the portfolio creation system, an operator, an organization, an adviser, and general users (hereinafter, they are collectively referred to as system participants) form a follow and follower relationship, and may perform exchange of information such as messages, images, or videos. Each system participant may ask a question of other system participants, or may receive beneficial information or advices from the other system participants. Accordingly, each system participant can form a network and can use the network, and thus, it is possible to enhance productivity, and to achieve human growth due to mutual stimuli.

As shown in FIG. 23, in step 601, the control unit 101 displays an operator network screen on the display unit of the operator terminal 45. On the operator network screen, "follower", "following", "adviser", and "group" are displayed in a selectable form.

In step 602, the control unit 101 determines whether the "follower" is selected by an operator. In a case where it is determined that the "follower" is selected (Y in step 602), the control unit 101 causes the procedure to proceed to step 603, and in a case where it is determined that the "follower" is not selected (N in step 602), the control unit 101 causes the procedure to proceed to step 605.

In step 603, the control unit 101 reads the follow table 209.

In step 604, the control unit 101 displays a list of user IDs and user names of followers in which a followed user ID is the same as a user ID of an operator on the display unit of the operator terminal 45, and then, passes through the process.

Here, in a case where the control unit 101 determines that the "following" is selected instead of the "follower", the control unit 101 displays a list of followed user IDs relating to records in which a following user ID is the same as a user ID of an operator on the display unit of the operator terminal 45, and then, passes through the process.

In step 605, the control unit 101 determines whether the "adviser" is selected by the operator. In a case where it is determined that the "adviser" is selected (Y in step 605), the control unit 101 causes the procedure to proceed to step 606, and in a case where it is determined that the "adviser" is not selected (N in step 605), the control unit 101 causes the procedure to proceed to step 608.

In step 606, the control unit 101 reads an organization ID relating to a record in which a user ID is an operator ID, from the user table 205.

In step S607, the control unit 101 retrieves the adviser table 210 based on the read organization ID, and displays a list of adviser IDs and adviser names relating to corresponding records on the display unit of the operator terminal 45, and then, passes through the process.

In step 608, the control unit 101 determines whether the "group" is selected by the operator. In a case where it is determined that the "group" is selected (Y in step 608), the control unit 101 causes the procedure to proceed to step 609, and in a case where it is determined that the "group" is not selected (N in step 608), the control unit 101 passes through the process.

In step 609, the control unit 101 retrieves the group user table 211 based on the user ID of the operator, and reads a group name in the corresponding record.

In step 610, the control unit 101 retrieves the group user table 211 based on the read group name, and displays a list of corresponding user IDs and user names on the display unit of the operator terminal 45, and then, passes through the process.

In the operator network process, if anyone of the listed system participants is selected and clicked, a profile of the selected participant is displayed as a pop-up. Further, by clicking an icon which is separately provided, it is possible to add a person to be newly followed, or to transmit a message.

Figure 24:
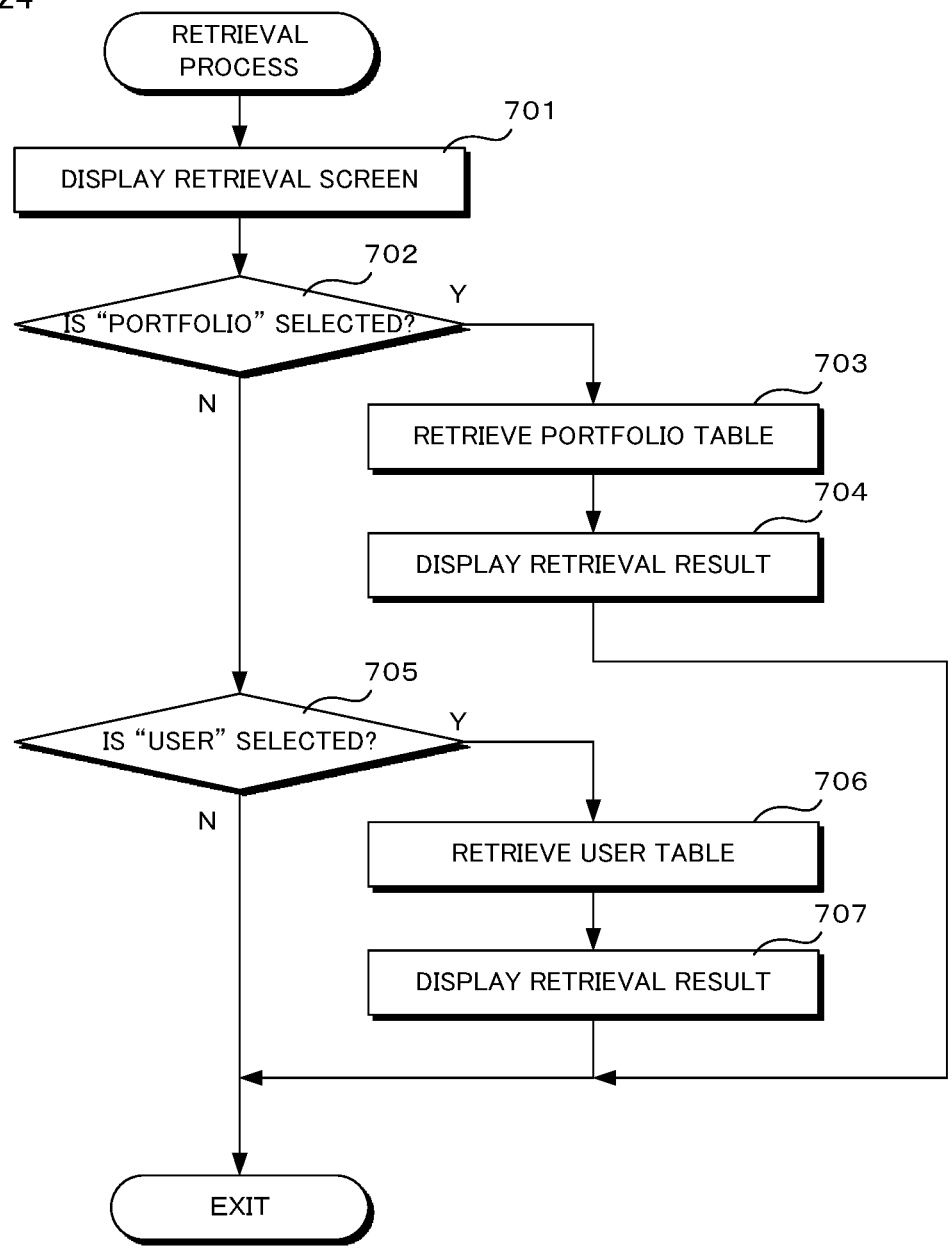
FIG. 24 is a flowchart illustrating an operation of a retrieval process.

FIG. 24 is a flowchart illustrating an operation of a retrieval process. As shown in FIG. 24, in step 701, the control unit 101 displays a retrieval screen on the display unit of the operator terminal 45. The "portfolio" and the "user" are displayed on the retrieval screen in a selectable form.

In step 702, the control unit 101 determines whether the "portfolio" is selected. In a case where it is determined that the "portfolio" is selected (Y in step 702), the control unit 101 causes the procedure to proceed to step 703, and in a case where it is determined that the "portfolio" is not selected (N in step 702), the control unit 101 causes the procedure to proceed to step 705.

In step 703, the control unit 101 displays a screen for setting portfolio retrieval conditions on the display unit of the operator terminal 45, and retrieves the portfolio table 212 using the set retrieval conditions.

In step 704, the control unit 101 displays a retrieval result on the display unit of the operator terminal 45.

In step 705, the control unit 101 determines whether the "user" is selected. In a case where it is determined that the "user" is selected (Y in step 705), the control unit 101 causes the procedure to proceed to step 706, and in a case where it is determined that the "user" is not selected (N in step 705), the control unit 101 passes through the process.

In step 706, the control unit 101 displays a screen for setting user retrieval conditions on the display unit of the operator terminal 45, and retrieves the user table 205 using the set retrieval conditions.

In step 704, the control unit 101 displays a retrieval result on the display unit of the operator terminal 45, and then, passes through the process.

In the retrieval process, if any one of the listed system participants is selected and clicked, a profile of the selected participant is displayed as a pop-up. Further, by clicking an icon which is separately provided, it is possible to add a person indicated by the clicked icon as a person to be newly followed, or to transmit a message.

Figure 25:
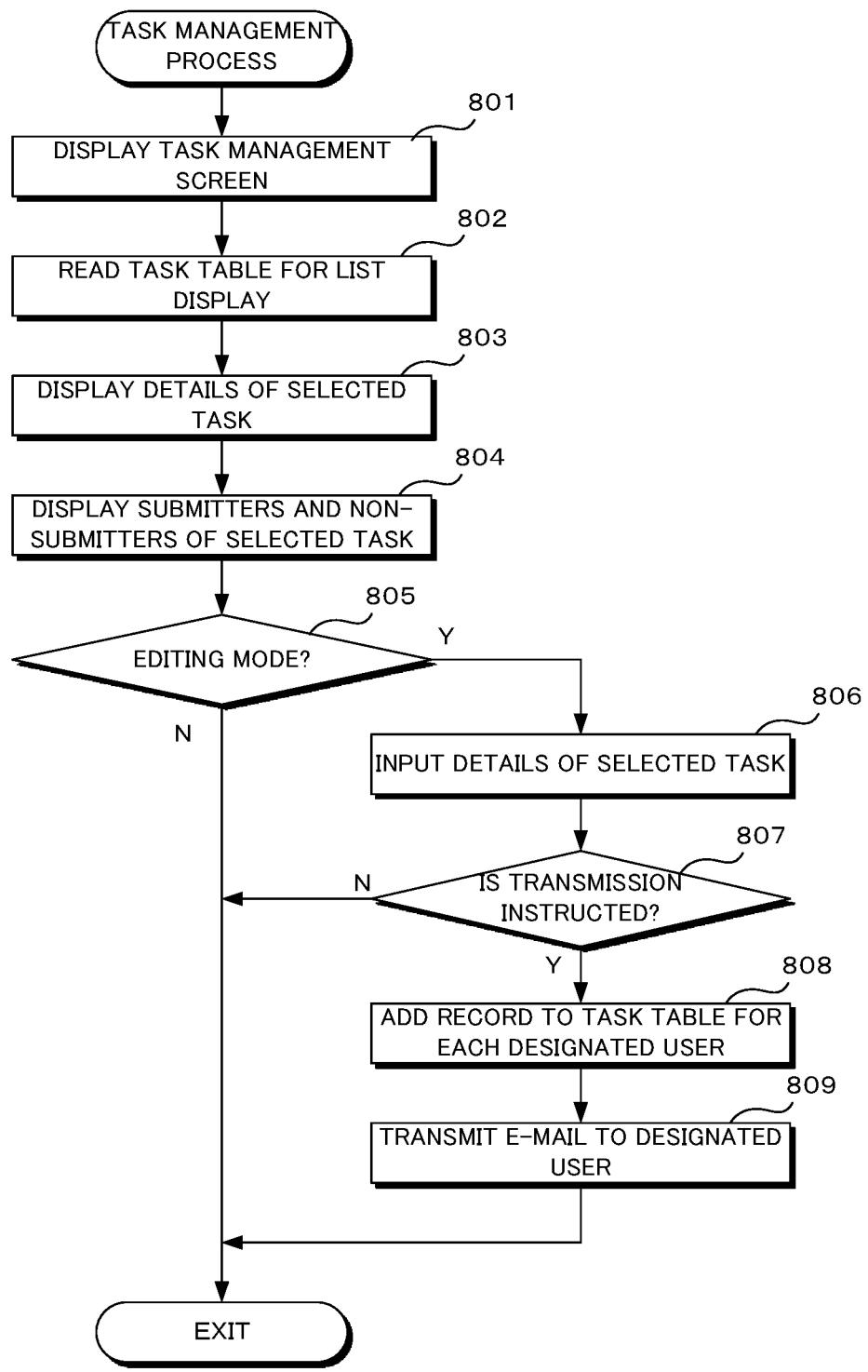
FIG. 25 is a flowchart illustrating an operation of a task management process.

FIG. 25 is a flowchart illustrating an operation of a task management process. As shown in FIG. 25, in step 801, the control unit 101 displays a task management screen on the display unit of the operator terminal 45. On the task management screen, buttons for selecting "not transmitted", "transmitted", and "draft" are displayed.

In step 802, the control unit 101 reads the task table 215, and displays a list of tasks according to an operator's selection. In a case where the "not transmitted" is selected, the control unit 101 displays a list of tasks which are not transmitted to users, in a case where the "transmitted" is selected, the control unit 101 displays a list of tasks which are already transmitted to users, and in a case where the "draft" is selected, the control unit 101 displays a list of tasks which are being created, respectively. The operator may individually select and designate tasks.

In step 803, the control unit 101 displays details of a task selected by an operator.

In step 804, the control unit 101 retrieves the task reception table 216 based on a task serial number of the selected task, and reads corresponding user IDs and user names as submission targets. Then, the control unit 101 retrieves the task reply table 217 based on the task serial number of the selected task, and reads corresponding user IDs and user names as submitters. The control unit 101 displays a list of users obtained by subtracting the submitters from the submission targets as non-submitters, and displays a list of the submitters in a lower portion thereof.

In step 805, the control unit 101 determines whether an editing mode in which task editing is performed by an operator is instructed. In a case where it is determined that the editing mode is instructed (Y in step 805), the control unit 101 causes the procedure to proceed to step 806, and in a case where it is determined that the editing mode is not instructed (N in step 805), the control unit 101 passes through the process.

In step 806, the control unit 101 edits and inputs details about the selected task by an input operation of the operator.

In step 807, the control unit 101 determines whether a transmission instruction is made by an operator. In a case where it is determined that the transmission instruction is made (Y in step 807), the control unit 101 causes the procedure to proceed to step 808, and in a case where it is determined that the transmission instruction is not made (N in step 807), the control unit 101 passes through the process.

In step 808, the control unit 101 displays a list of user IDs and user names on the display unit of the operator terminal 45 according to the instruction of the operator. The control unit 101 retrieves the task table 215 based on a selected user ID and a task serial number, and updates detailed information about a task in a case where there is a record. Further, in a case where there is no record, the control unit 101 adds a record and deletes a record of a task serial number corresponding to a user ID which is not selected.

In step 809, the control unit 101 performs updating, addition, or deletion with respect to the task reception table 216 to be consistent with a record updated, added, and deleted in step 807, transmits a notification e-mail to an e-mail address of a corresponding submission target, and then, passes through the process.

Figure 26:
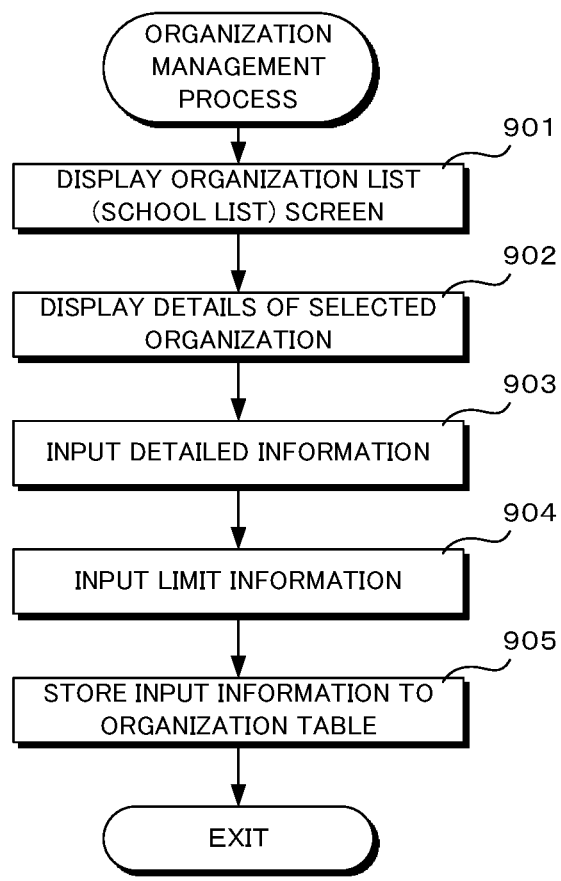
FIG. 26 is a flowchart illustrating an operation of an organization management process.

FIG. 26 is a flowchart illustrating an operation of an organization management process. As shown in FIG. 26, in step 901, the control unit 101 reads organization IDs and organization names from the organization table 202, and displays an organization list (scroll list) screen on the display unit of the operator terminal 45.

In step 902, the control unit 101 displays details of a selected organization by an operator.

In step 903, the control unit 101 causes the operator to input information about the details of the organization.

In step 904, the control unit 101 causes the operator to input limit information which is information relating to limit of functions to be provided to each organization.

In step 905, the control unit 101 stores the input information in an organization table, and then, passes through the process.

(Organization Process)

Figure 27:
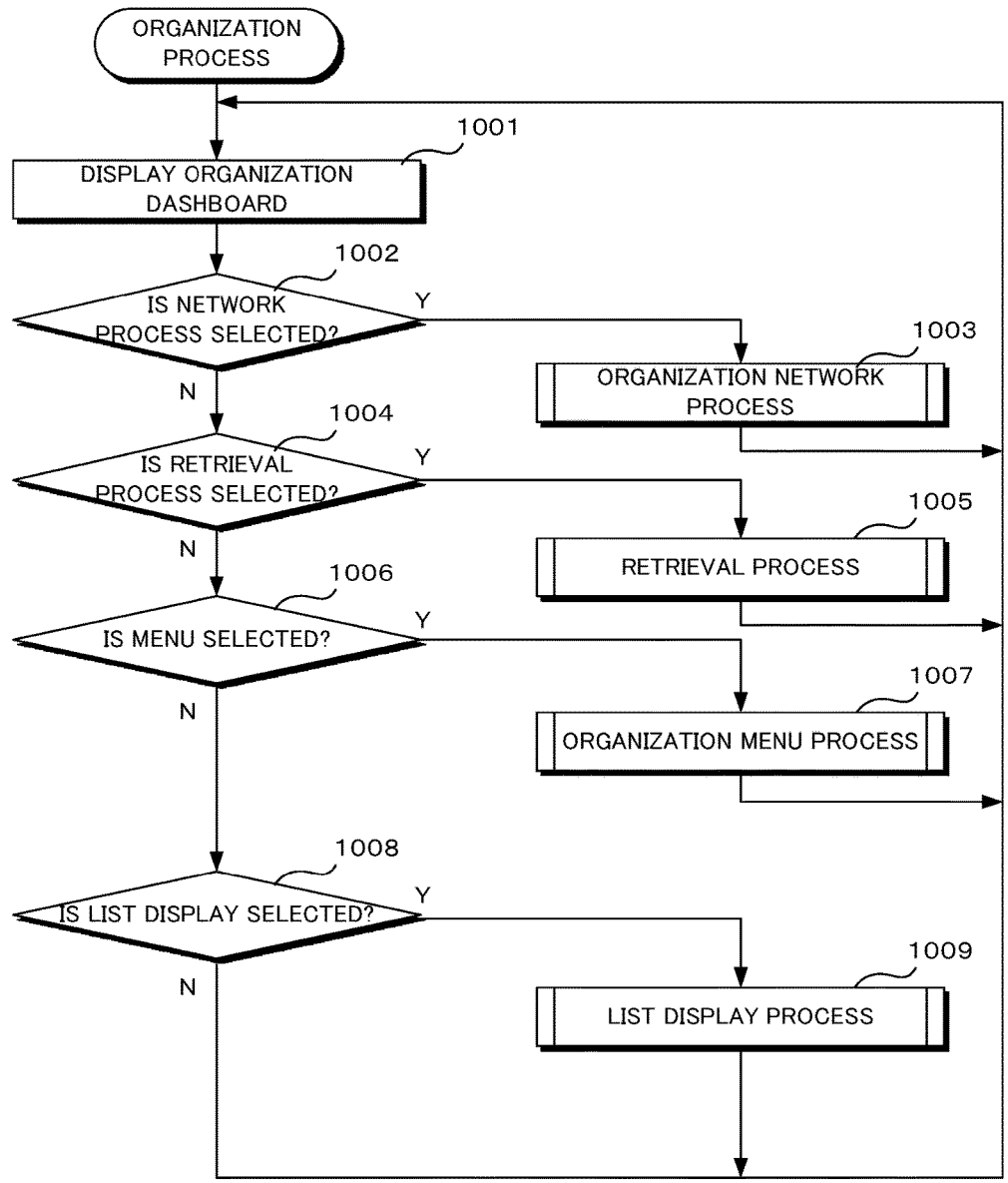
FIG. 27 is a flowchart illustrating an operation of an organization process.

FIG. 27 is a flowchart illustrating an operation of an organization process. As shown in FIG. 27, in step 1001, the control unit 101 displays an organization dashboard on a display unit of the organization terminal 42. On the organization dashboard, buttons capable of selecting "network", "retrieval", "menu", and "list display" are displayed. Here, since an operation of a retrieval process executed in a case where the "retrieval" is selected is the same as the operation of the retrieval process described in FIG. 24, except that a display output destination is the organization terminal 42 and an operator is an organization member, description thereof will not be repeated.

In step 1002, the control unit 101 determines whether the "network" is selected. In a case where it is determined that the "network" is selected (Y in step 1002), the control unit 101 causes the procedure to proceed to step 1003, and in a case where it is determined that the "network" is not selected (N in step 1002), the control unit 101 causes the procedure to proceed to step 1004.

In step 1003, the control unit 101 executes an organization network process, and then, causes the procedure to return to step 1001.

In step 1004, the control unit 101 determines whether the "retrieval" is selected. In a case where it is determined that the "retrieval" is selected (Y in step 1004), the control unit 101 causes the procedure to proceed to step 1005, and in a case where it is determined that the "retrieval" is not selected (N in step 1004), the control unit 101 causes the procedure to proceed to step 1006.

In step 1005, the control unit 101 executes a retrieval process, and causes the procedure to return to step 1001.

In step 1006, the control unit 101 determines whether the "menu" is selected. In a case where it is determined that the menu is selected (Y in step 1006), the control unit 101 causes the procedure to proceed to step 1007, and in a case where it is determined that the menu is not selected (N in step 1006), the control unit 101 causes the procedure to proceed to step 1008.

In step 1007, the control unit 101 executes an organization menu process, and causes the procedure to return to step 1001.

In step 1008, the control unit 101 determines whether the "list display" is selected. In a case where it is determined that the "list display" is selected (Y in step 1008), the control unit 101 causes the procedure to proceed to step 1009, and in a case where it is determined that the "list display" is not selected (N in step 1008), the control unit 101 causes the procedure to return to step 1001.

In step 1009, the control unit 101 executes a list display process, and then, causes the procedure to return to step 1001.

Figure 28:
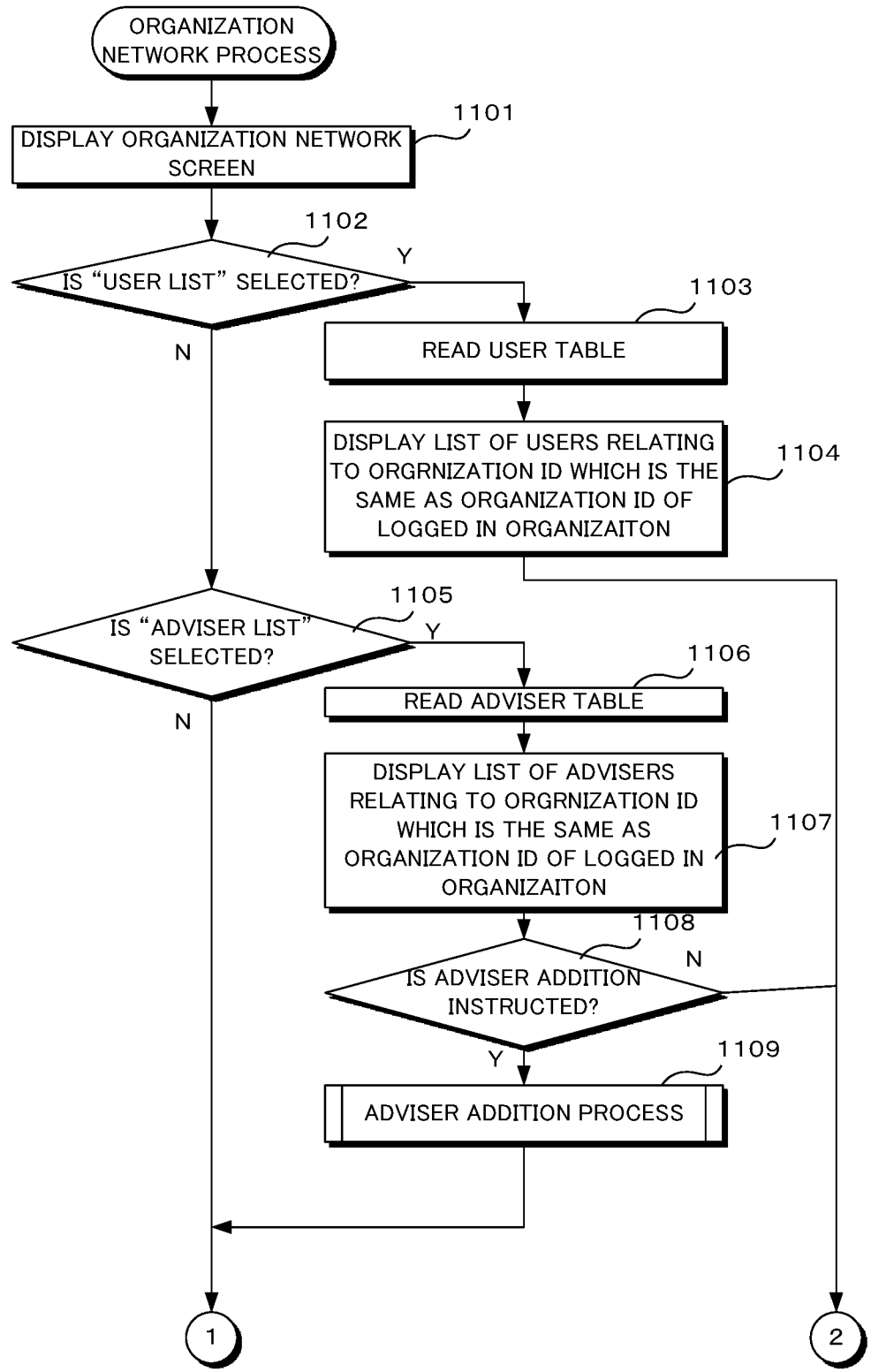
FIG. 28 is a flowchart illustrating an operation of an organization network process.

FIG. 28 is a flowchart illustrating an operation of an organization network process. As shown in FIG. 28, in step 1101, the control unit 101 displays an organization network screen on the display unit of the organization terminal 42. On the organization network screen, buttons for selecting "user list", "adviser list", and "group" are displayed.

In step 1102, the control unit 101 determines whether the "user list" is selected. In a case where it is determined that the "user list" is selected (Y in step 1102), the control unit 101 causes the procedure to proceed to step 1103, and in a case where it is determined that the "user list" is not selected (N in step 1102), the control unit 101 causes the procedure to proceed to step 1105.

In step 1103, the control unit 101 reads the user table 205.

In step 1104, the control unit 101 displays a list of user IDs and user names relating to records in which an organization corresponds to an organization ID of a logged in organization, among read records, and then, passes through the process.

In step 1105, the control unit 101 determines whether the "adviser list" is selected. In a case where it is determined that the "adviser list" is selected (Y in step 1105), the control unit 101 causes the procedure to proceed to step 1106, and in a case where it is determined that the "adviser list" is not selected (N in step 1105), the control unit 101 causes the procedure to proceed to step 1201, in FIG. 29.

In step 1106, the control unit 101 reads the adviser table 210.

In step 1107, the control unit 101 displays a list of adviser IDs and adviser names relating to records in which an organization corresponds to an organization ID of a logged in organization, among the read records. If any one of the displayed adviser names is selected, the control unit 101 displays details about the selected adviser on the display unit of the organization terminal 42. In a case where detailed information about an adviser is updated, the control unit 101 updates the adviser table 210 based on the updated content. In a case where deletion of an adviser is selected, the control unit 101 deletes a corresponding record from the adviser table 210.

In step 1108, the control unit 101 determines whether addition of an adviser is instructed. In a case where it is determined that the addition of the adviser is instructed (Y in step 1108), the control unit 101 causes the procedure to proceed to step 1109, and in a case where it is determined that the addition of the adviser is not instructed (N in step 1108), the control unit 101 passes through the process.

Figure 29:
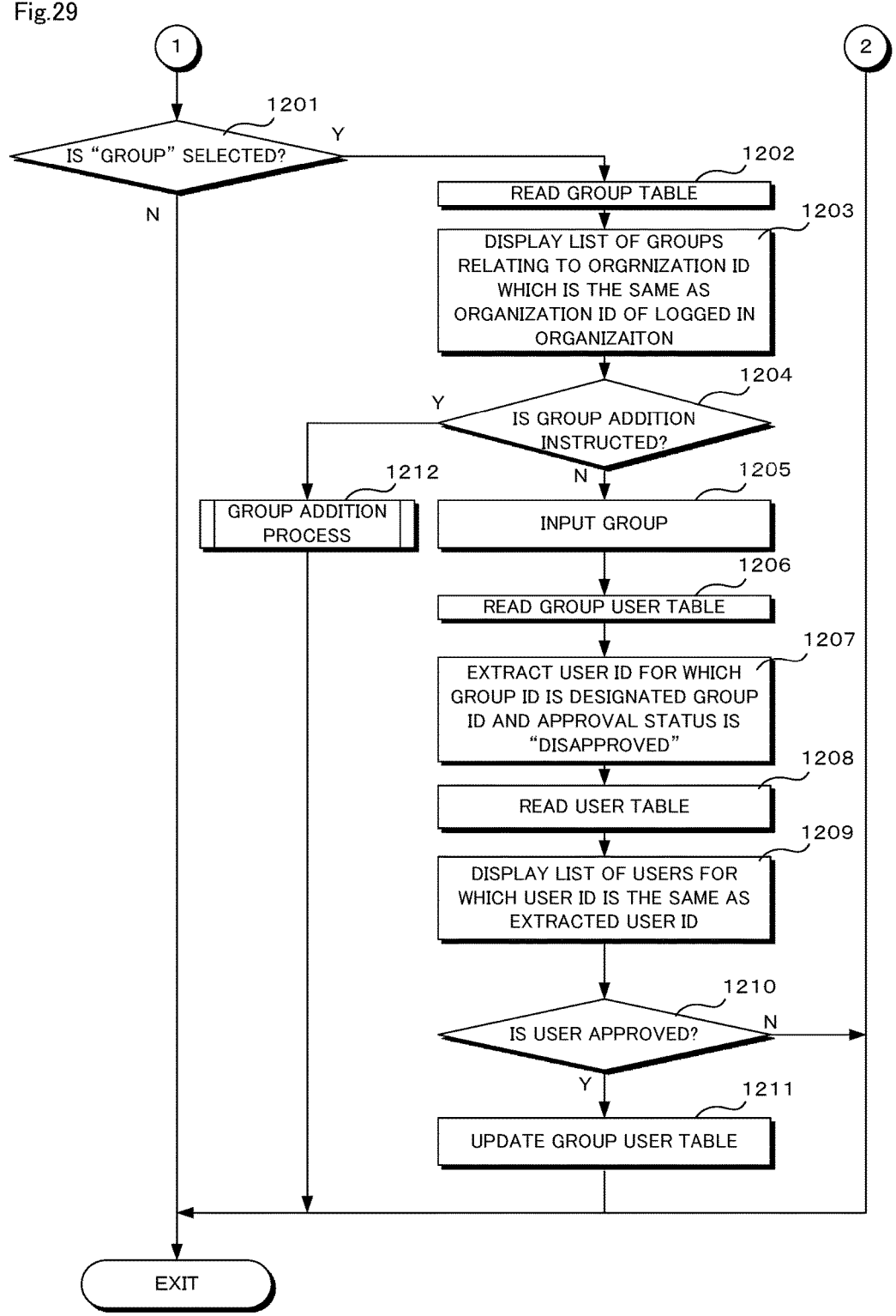
FIG. 29 is a subsequent flowchart illustrating the operation of the organization network process.

In step 1109, the control unit 101 adds a record to the adviser table 210 based on information relating to an adviser input by an organization member, and then, causes the procedure to proceed to step 1201 in FIG. 29.

FIG. 29 is a subsequent flowchart illustrating an operation of the organization network process. As shown in FIG. 29, in step 1201, the control unit 101 determines whether the "group" is selected. In a case where it is determined that the "group" is selected (Y in step 1201), the control unit 101 causes the procedure to proceed to step 1202, and in a case where it is determined that the "group" is not selected (N in step 1201), the control unit 101 passes through the process.

In step 1202, the control unit 101 reads the group table 204.

In step 1203, the control unit 101 displays a list of group IDs and group names relating to records in which an organization corresponds to an organization ID of a logged in organization, among read records. If any one of the displayed group names is selected, the control unit 101 displays details about the selected group on the display unit of the organization terminal 42. In a case where detailed information about a group is updated, the control unit 101 updates the group table 204 based on the updated content. In a case where deletion of a group is selected, the control unit 101 deletes a corresponding record from the group table 204.

In step 1204, the control unit 101 determines whether addition of a group is instructed. In a case where it is determined that the addition of the group is instructed (Y in step 1204), the control unit 101 causes the procedure to proceed to step 1212, and in a case where it is determined that addition of group is not instructed (N in step 1204), the control unit 101 causes the procedure to proceed to step 1205.

In step 1205, the control unit 101 causes an organization member to input designation of a group.

In step 1206, the control unit 101 retrieves and reads the group user table 211 based on an organization name and a group ID of the designated group.

In step 1207, the control unit 101 extracts a record of a user ID for which a group ID corresponds to a group name and an approval status is "disapproved", from read records.

Here, the approval status includes "disapproved" in a case where there is a user who cannot obtain a registration approval from an adviser among users for new registration and "approved" in a case where all the users obtain the approval.

In step 1208, the control unit 101 reads the user table 205.

In step 1209, the control unit 101 displays a list of user IDs and user names relating to records in which a user ID is the same as a user ID in the record extracted in step 1207, among the read records.

In step 1210, the control unit 101 determines whether a user is approved. In a case where it is determined that the user is approved by an organization member (Y in step 1210), and the control unit 101 causes the procedure to proceed to step 1211, and in a case where it is determined that the user is not approved (N in step 1210), the control unit 101 passes through the process.

In step 1211, the control unit 101 stores "approved" in the group user table 211 as an approved status of a record of a user ID of the approved user, to thereby update the group user table 211.

In step 1212, the control unit 101 adds a record indicating a new group to the group table 204, and then, passes through the process.

The above-described user approval operation may be performed in the organization network process by an organization member, or instead, may be similarly performed in a network process in an adviser process.

(Registration of New User)

Here, a configuration of new user registration of the portfolio creation system according to this embodiment will be described.

In the portfolio creation system, it is necessary that a configuration capable of preventing a person who is not present or a person who is present but is a third party from pretending to be a host user is provided. This configuration is realized as follows.

First, a user who wants new registration designates an organization ID and a group ID using an e-mail address or an ID designated by the portfolio creation system as a user ID to perform provisional registration in the portfolio creation system.

In this stage, an approval status of the group user table 211 is "disapproved", and the portfolio creation system does not permit functions other than profile registration and editing with respect to the user.

An authority capable of changing the approval status from "disapproved" to "approved" is given to an organization member or an adviser from the portfolio creation system. The organization member or the adviser actually confirms that the provisionally registered user is present, and then, changes the approval status of the group user table 211 to "approved" using a network process of the portfolio creation system.

Accordingly, it is possible to reliably prevent registration of a person who is not present or pretension of a third party. If the approval status is changed to "approved" by the organization member or the adviser, the portfolio creation system permits the general user to use functions given to general users.

Figure 30:
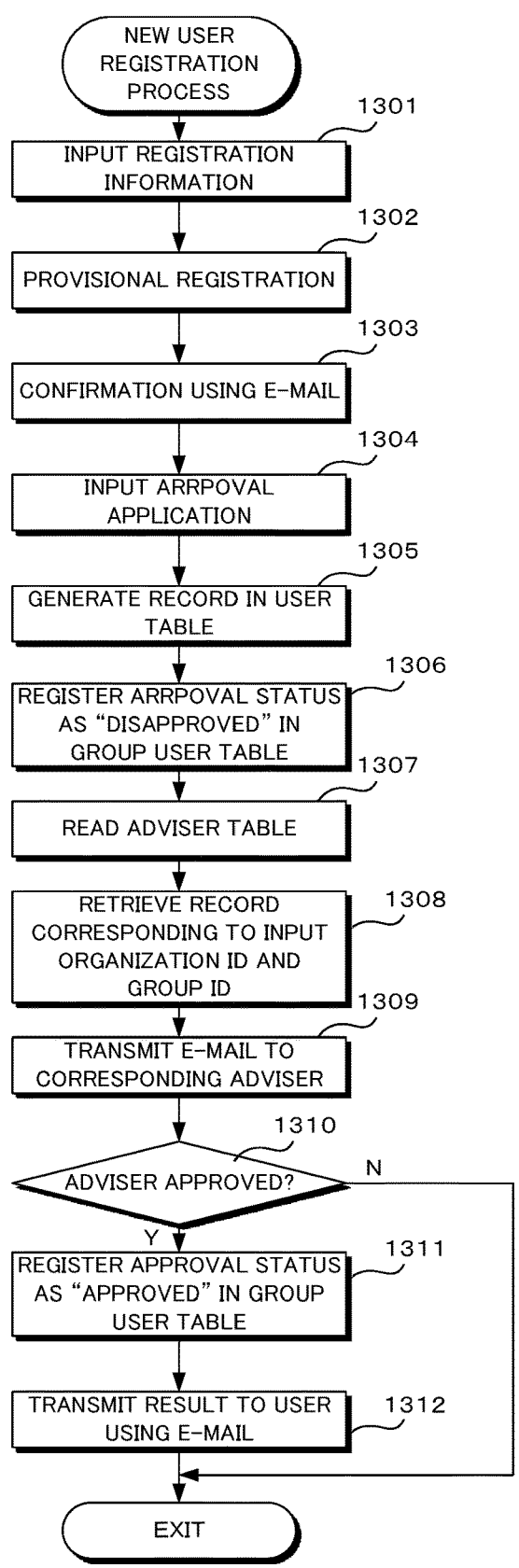
FIG. 30 is a flowchart illustrating an operation of a new user registration process.

FIG. 30 is a flowchart illustrating an operation of a new user registration process. As shown in FIG. 30, in step 1301, the control unit 101 causes a general user to input registration information.

In step 1302, the control unit 101 performs provisional registration with respect to the user. Specifically, the general user registers an e-mail address and a password for log-in through a user terminal 41.

In step 1303, the control unit 101 transmits a confirmation e-mail including a URL of a web page for confirmation to the input e-mail address.

In step 1304, the general user opens the URL written in the transmitted confirmation e-mail, and inputs an organization ID, a group ID, and an application for approval to the portfolio creation system.

In step 1305, the control unit 101 generates an additional record in the user table 205 according to the input registration information.

In step 1306, the control unit 101 adds a new record to the group user table 211. However, in this stage, an approval status of the group user table 211 is "disapproved".

In step 1307, the control unit 101 reads the adviser table 210.

In step 1308, the control unit 101 retrieves a record corresponding to the input organization ID and group ID from read records.

In step 1309, the control unit 101 reads an adviser ID and an adviser e-mail address written in the retrieved record, and transmits an approval request e-mail.

In step 1310, the control unit 101 determines whether there is an adviser's approval. In a case where it is determined that there is the adviser's approval (Y in step 1310), the control unit 101 causes the procedure to proceed to step 1311, and in a case where it is determined that there is no approval (N in step 1310), the control unit 101 passes through the process.

In step 1311, the control unit 101 stores "approved" as an approval status of the corresponding record of the group user table 211.

In step 1312, the control unit 101 notifies the general user of an approval result using an e-mail, and then, passes through the process.

(General User Process)

A general user process to be described below represents functions permitted to a general user by the control unit 101 in a case where an approval status is "approved".

Figure 31:
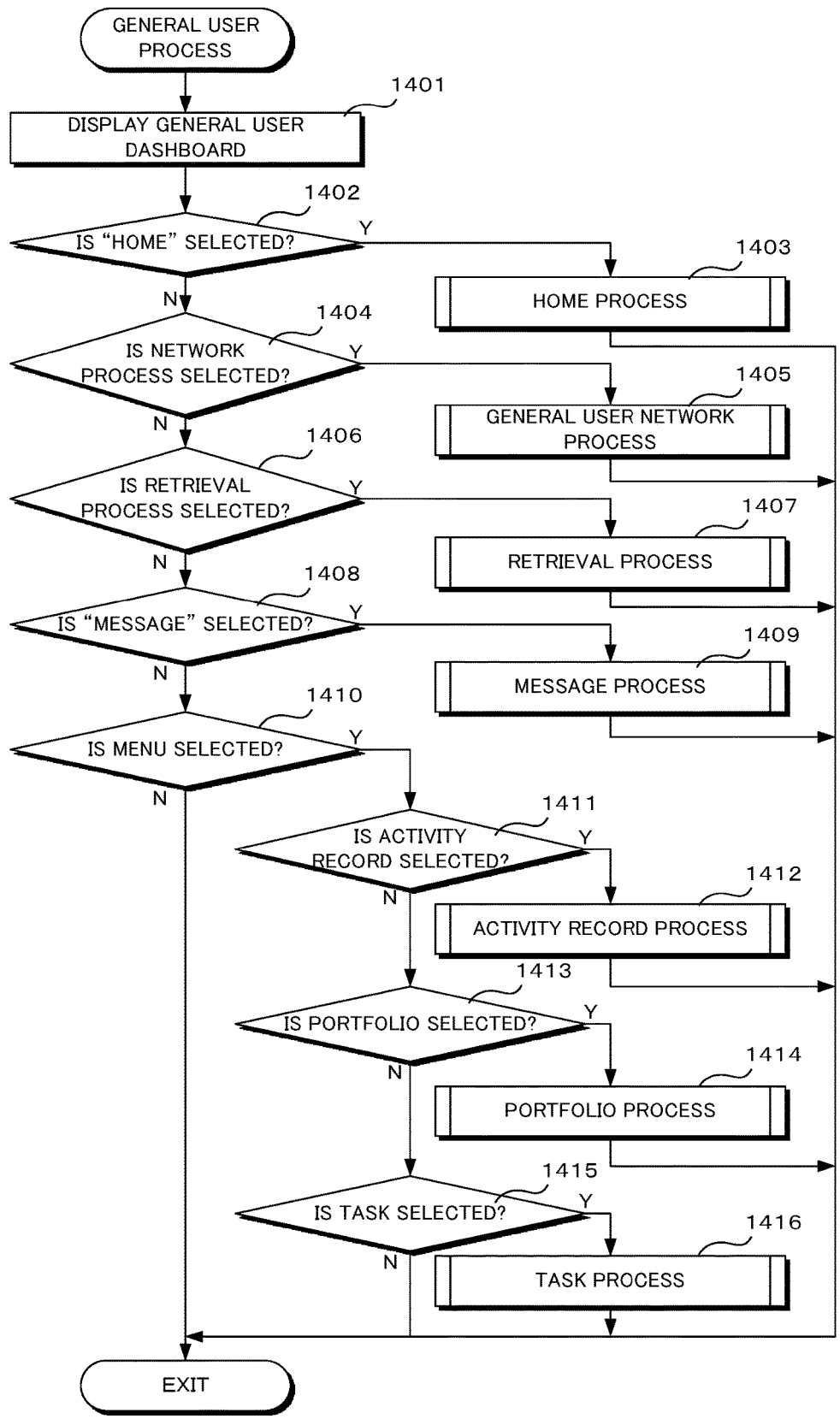
FIG. 31 is a flowchart illustrating an operation of a general user process.

FIG. 31 is a flowchart illustrating an operation of a general user process. As shown in FIG. 31, in step 1401, if log-in is approved, the control unit 101 displays a general user dashboard on the user terminal 41.

On the general user dashboard, buttons of "home", "network", "retrieval", "message" and "menu" are displayed.

In step 1402, the control unit 101 determines whether the "home" is selected. In a case where it is determined that the "home" is selected (Y in step 1402), the control unit 101 causes the procedure to proceed to step 1403, and in a case where it is determined that the "home" is not selected (N in step 1402), the control unit 101 causes the procedure to proceed to step 1404.

In step 1403, the control unit 101 executes a home process, and then, passes through the process.

In step 1404, the control unit 101 determines whether the "network" is selected. In a case where it is determined that the "network" is selected (Y in step 1404), the control unit 101 causes the procedure to proceed to step 1405, and in a case where it is determined that the "network" is not selected (N in step 1404), the control unit 101 causes the procedure to proceed to step 1406.

In step 1405, the control unit 101 executes a general user network process, and then, passes through the process.

In step 1406, the control unit 101 determines whether the "retrieval" is selected. In a case where it is determined that the "retrieval" is selected (Y in step 1406), the control unit 101 causes the procedure to proceed to step 1407, and in a case where it is determined that the "retrieval" is not selected (N in step 1406), the control unit 101 causes the procedure to proceed to step 1408.

In step 1407, the control unit 101 executes a retrieval process which corresponds to a retrieval unit, and then, passes through the process. Specifically, in the retrieval process, the "portfolio" instead of the "user" may be selected. In a case where it is determined that the "portfolio" is selected, the control unit 101 displays a portfolio retrieval screen on the display unit of the user terminal 41. The portfolio retrieval screen includes a retrieval free word input column, a retrieval target select button for designating a retrieval target range, a different condition setting column, and a retrieval button for instructing retrieval. The retrieval target select button includes, for example, buttons for designating "portfolio", "resume", "universal college application (UCA)", or the like. The different condition setting column includes columns for designating "name", "gender", "grade", "age", "organization", "group", "studying abroad", "internship", "job history", or the like. In a case where it is determined that the retrieval button is pressed, the control unit 101 retrieves a range designated according to a designated condition, and displays an extracted target on a result display screen. Through such a retrieval process, a general user can retrieve and read content such as a portfolio of a different general user, and can use the result as a reference of his/her own future activities.

In step 1408, the control unit 101 determines whether the "message" is selected. In a case where it is determined that the "message" is selected (Y in step 1408), the control unit 101 causes the procedure to proceed to step 1409, and in a case where it is determined that the "message" is not selected (N in step 1408), the control unit 101 causes the procedure to proceed to step 1410.

In step 1409, the control unit 101 executes a message process, and then, passes through the process.

In step 1410, the control unit 101 determines whether the "menu" is selected. In a case where it is determined that the "menu" is selected (Y in step 1410), the control unit 101 causes the procedure to proceed to step 1411, and in a case where it is determined that the "menu" is not selected (N in step 1410), the control unit 101 passes through the process.

If the menu is selected, the control unit 101 displays a menu on the display unit of the user terminal 41. On the menu, buttons of "activity record", "portfolio", and "task" are displayed.

In step 1411, the control unit 101 determines whether the "activity record" is selected. In a case where it is determined that the "activity record" is selected (Y in step 1411), the control unit 101 causes the procedure to proceed to step 1412, and in a case where it is determined that the "activity record" is not selected (N in step 1411), the control unit 101 causes the procedure to proceed to step 1413.

In step 1412, the control unit 101 executes an activity record process, and then, passes through the process.

In step 1413, the control unit 101 determines whether the "portfolio" is selected. In a case where it is determined that the "portfolio" is selected (Y in step 1413), the control unit 101 causes the procedure to proceed to step 1414, and in a case where it is determined that the "portfolio" is not selected (N in step 1413), the control unit 101 causes the procedure to proceed to step 1415.

In step 1414, the control unit 101 executes a portfolio process, and then, passes through the process.

In step 1415, the control unit 101 determines whether the "task" is selected. In a case where it is determined that the "task" is selected (Y in step 1415), the control unit 101 causes the procedure to proceed to step 1416, and in a case where it is determined that the "task" is not selected (N in step 1415), the control unit 101 passes through the process.

In step 1416, the control unit 101 executes a task process, and then, passes through the process.

(Home Process of General User)

Figure 32:
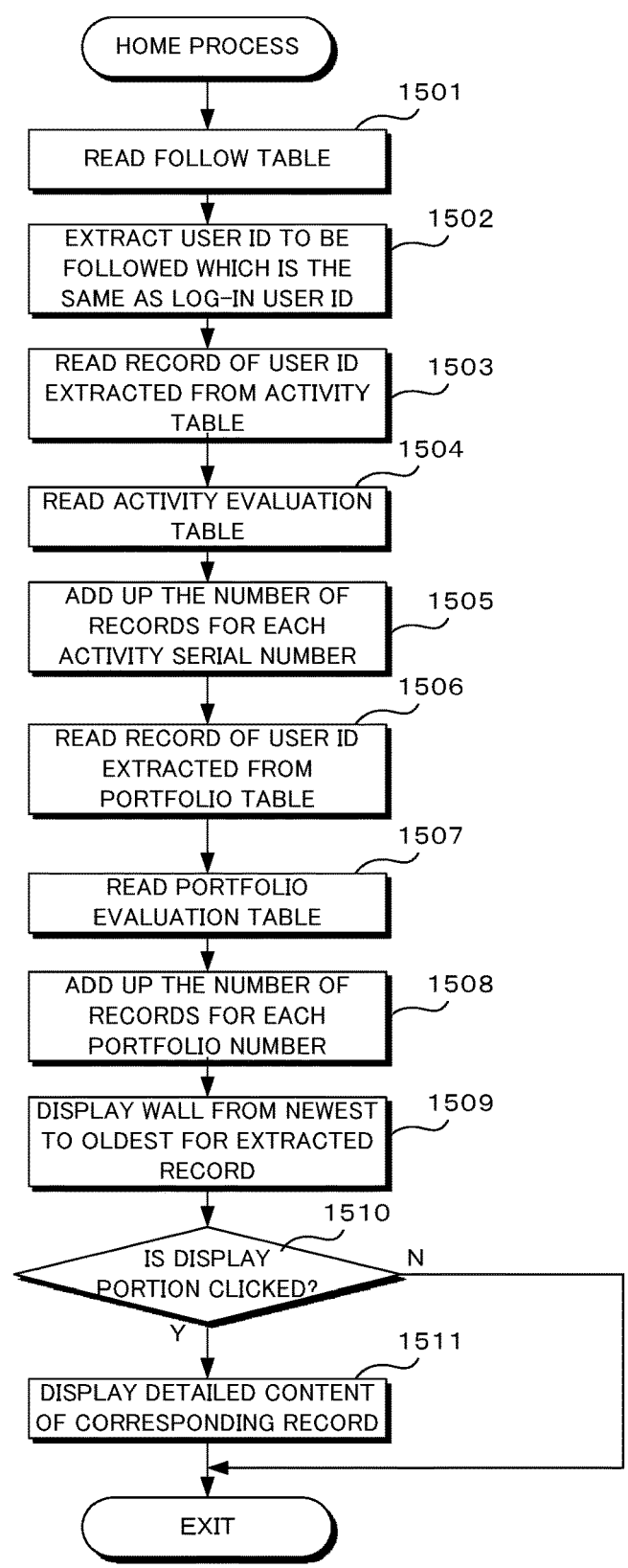
FIG. 32 is a flowchart illustrating an operation of a home process.

FIG. 32 is a flowchart illustrating an operation of a home process. If a general user logs in, disclosed activity records and disclosed portfolios of general users to be followed by the log-in general user are displayed from newest to oldest. This display screen is hereinafter referred to as a wall. A display operation of the wall in the control unit 101 will be described hereinafter.

As shown in FIG. 32, in step 1501, the control unit 101 reads the follow table 209.

In step 1502, the control unit 101 extracts a record in which a user ID to be followed is the same as the log-in user ID, from read records.

In step 1503, the control unit 101 reads a user ID to be followed from the extracted record, and retrieves and reads the activity table 206 based on the read user ID.

In step 1504, the control unit 101 reads an activity serial number of the record extracted from the activity table 206, and reads an activity comment table and an activity evaluation table based on the user ID and the activity serial number.

In step 1505, the control unit 101 adds up and totals up the number of records in the read activity evaluation table for each activity serial number.

In step 1506, the control unit 101 retrieves the portfolio table 212 based on the user ID of the user to be followed, extracted in step 1502, and reads a corresponding record.

In step 1507, the control unit 101 retrieves the portfolio comment table 213 and the portfolio evaluation table 214 based on the user ID and a portfolio number of the read record, and reads the corresponding record.

In step 1508, the control unit 101 adds up the number of records in the portfolio evaluation table 214 for each portfolio number.

In step 1509, the control unit 101 displays the read activity records and portfolios from newest to oldest together with comments and added-up values on the wall. Here, the added-up value corresponds to the number of good evaluations made with respect to the activity record or the portfolio.

In step 1510, the control unit 101 determines whether the activity record or the portfolio displayed on the wall is clicked. In a case where it is determined that the displayed activity record or the portfolio is clicked (Y in step 1510), the control unit 101 causes the procedure to proceed to step 1511, and in a case where it is determined that the displayed activity record or portfolio is not clicked (N in step 1510), the control unit 101 passes through the process.

In step 1511, the control unit 101 displays details about the clicked activity record or portfolio on the display unit of the user terminal 41.

(Message Process of General User)

In the portfolio creation system, information exchange may be performed with another user, an adviser, or the like according to the type of chatting.

Figure 33:
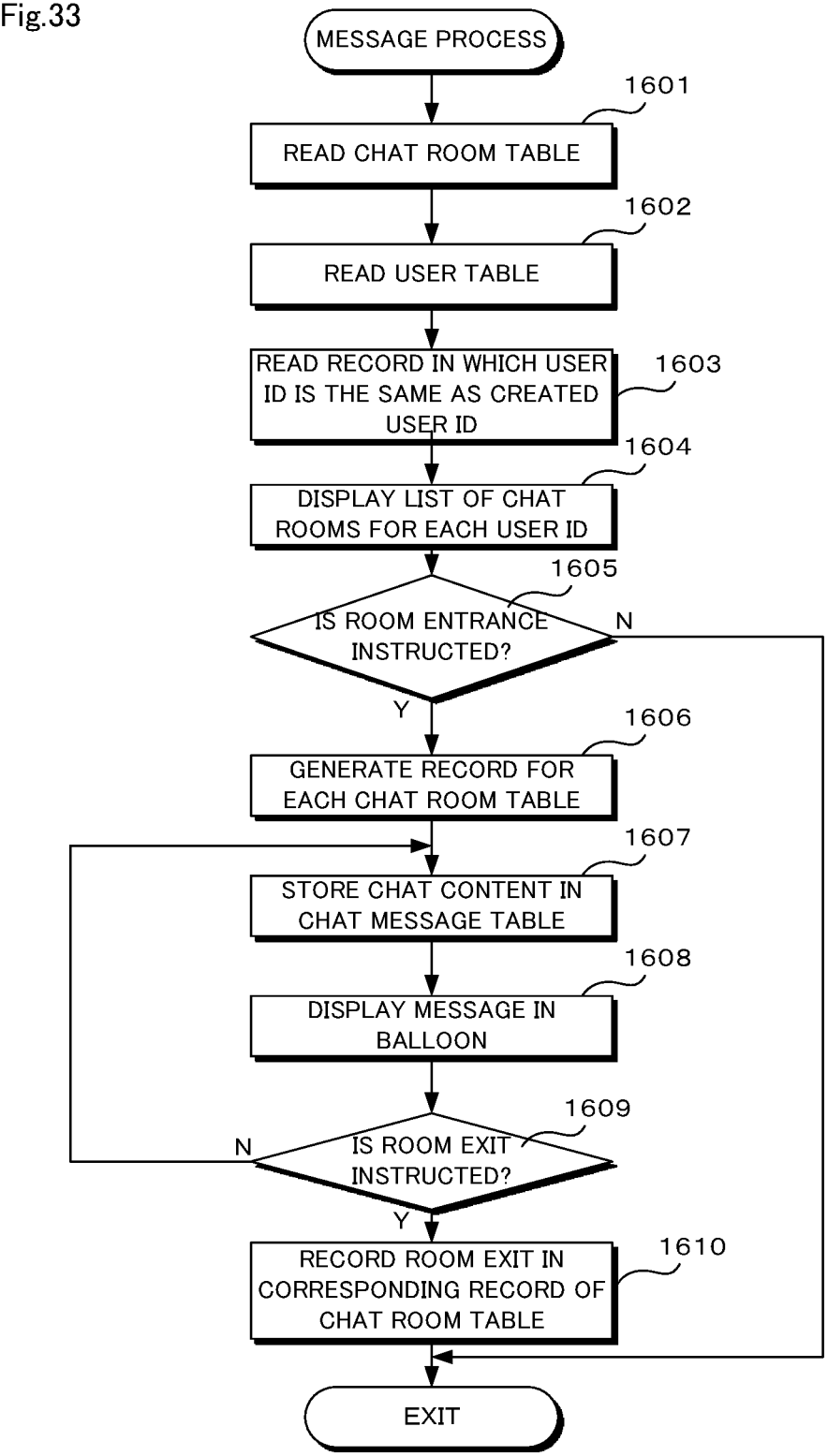
FIG. 33 is a flowchart illustrating an operation of a message process.

FIG. 33 is a flowchart illustrating an operation of a message process. As shown in FIG. 33, in step 1601, the control unit 101 reads the chat room table 218.

In step 1602, the control unit 101 reads the user table 205.

In step 1603, the control unit 101 reads a record in which a user ID is the same as a creation user ID of the chat room table 218, from records in the read user table 205.

In step 1604, the control unit 101 displays a list of room numbers of chat rooms for each user ID, on the display device of the user terminal 41.

In step 1605, the control unit 101 determines whether a chat room is selected and room entrance is instructed. In a case where it is determined that the room entrance is instructed (Y in step 1605), the control unit 101 causes the procedure to proceed to step 1606, and in a case where it is determined that the room entrance is not instructed (N in step 1605), the control unit 101 passes through the process.

In step 1606, the control unit 101 writes a user ID as a participant user ID, and generates a record in the room member table 219.

In step 1607, the control unit 101 stores a chat content in the chat message table 220.

In step 1608, the control unit 101 displays a message in a balloon on the display unit of the user terminal 41.

Here, in a lower portion of the balloon, information about a user who writes a message is displayed. If the displayed user is clicked, a profile and activity records of the user are displayed as a list. This function corresponds to as an in-message activity record display unit.

In step 1609, the control unit 101 determines whether room exit is instructed. In a case where it is determined that the room exit is instructed (Y in step 1609), the control unit 101 causes the procedure to proceed to step 1610, and in a case where it is determined that the room exit is not instructed (N in step 1609), the control unit 101 causes the procedure to return to step 1607.

In step 1610, the control unit 101 records the room exit in the corresponding record of the chat room table 218, and then, passes through the process.

(Activity Record Process of General User)

In the portfolio creation system, a general user may register activity records which are records of activities inside and outside a school, and may use the records as materials when creating a portfolio.

The registered activity records may be read and edited. Further, in the activity records on an activity record screen displayed on the display unit of the user terminal 41, a comment or evaluation from a different user or an adviser, and the degree of importance based on self-evaluation are displayed. The degree of importance is represented by the number of asterisks.

On the activity record screen, buttons of "profile editing", "activity record editing", and "portfolio editing" are displayed.

Figure 34:
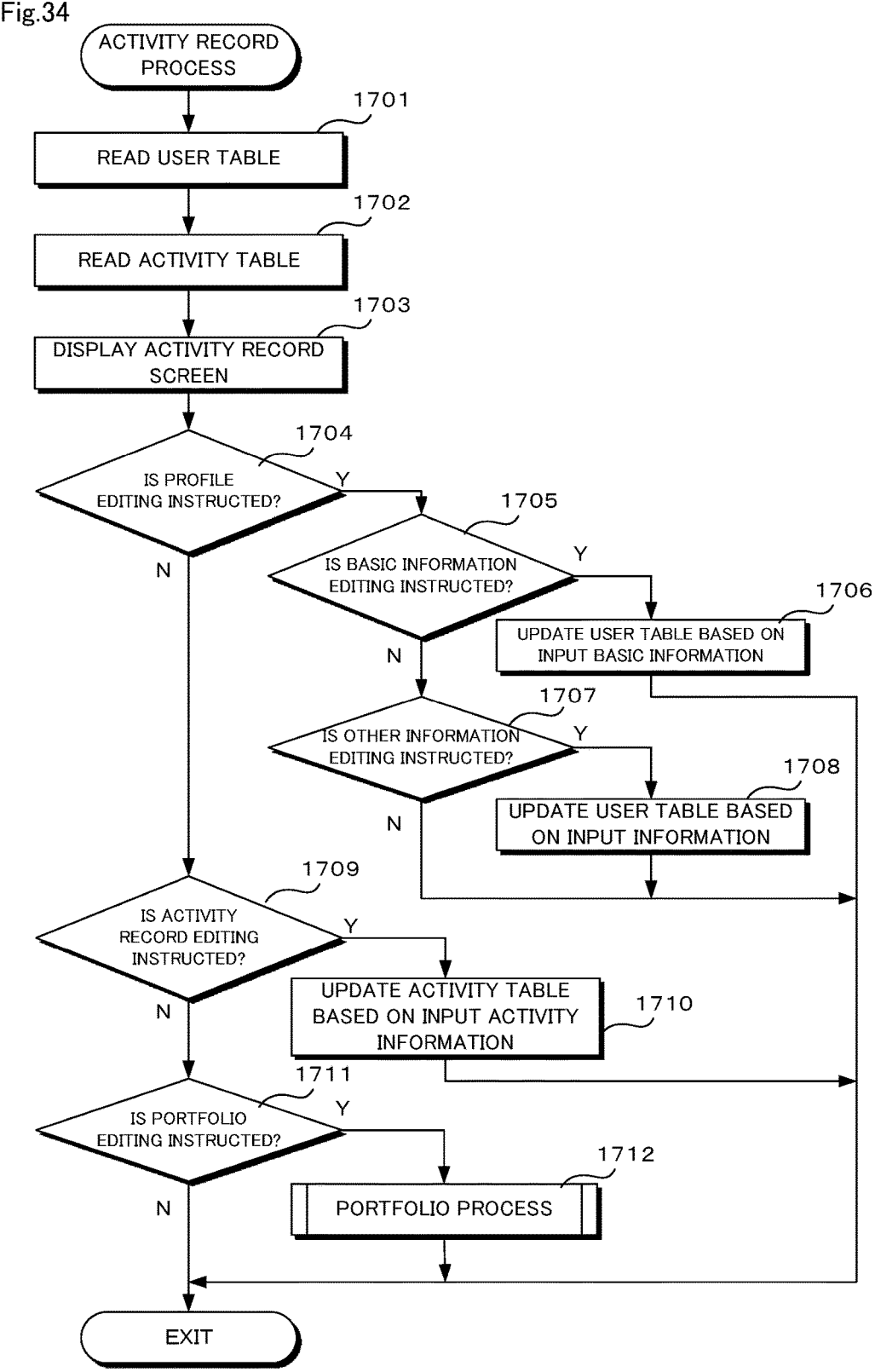
FIG. 34 is a flowchart illustrating an operation of an activity record process.

FIG. 34 is a flowchart illustrating an operation of an activity record process. As shown in FIG. 34, in step 1701, the control unit 101 reads the user table 205 based on a user ID.

In step 1702, the control unit 101 reads the activity table 206 based on the user ID.

In step 1703, the control unit 101 displays the activity record screen.

In step 1704, the control unit 101 determines whether profile editing is instructed. In a case where it is determined that the profile editing is instructed (Y in step 1704), the control unit 101 causes the procedure to proceed to step 1705, and in a case where it is determined that the profile editing is not instructed (N in step 1704), the control unit 101 causes the procedure to proceed to step 1709.

In step 1705, the control unit 101 determines whether basic information editing is instructed. In a case where it is determined that the basic information editing is instructed (Y in step 1705), the control unit 101 causes the procedure to proceed to step 1706, and in a case where it is determined that the basic information editing is not instructed (N in step 1705), the control unit 101 causes the procedure to proceed to step 1707.

In step 1706, the control unit 101 updates the user table 205 based on the input basic information, and then, passes through the process.

In step 1707, the control unit 101 determines whether other information editing is instructed. In a case where it is determined that the other information editing is instructed (Y in step 1707), the control unit 101 causes the procedure to proceed to step 1708, and in a case where it is determined that the other information editing is not instructed (N in step 1707), the control unit 101 passes through the process.

In step 1708, the control unit 101 updates the user table 205 based on the input information, and then, passes through the process.

In step 1709, the control unit 101 determines whether activity record editing is instructed. In a case where it is determined that the activity record editing is instructed (Y in step 1709), the control unit 101 causes the procedure to proceed to step 1710, and in a case where it is determined that the activity record editing is not instructed (N in step 1709), the control unit 101 causes the procedure to proceed to step 1711.

In step 1710, the control unit 101 updates the activity table based on activity information which is information about the input activity record, and then, passes through the process.

In step 1711, the control unit 101 determines whether portfolio editing is instructed. In a case where it is determined that the portfolio editing is instructed (Y in step 1711), the control unit 101 causes the procedure to proceed to step 1712, and in a case where it is determined that the portfolio editing is not instructed (N in step 1711), the control unit 101 passes through the process.

In step 1712, the control unit 101 executes a portfolio process, and then, passes through the process.

(Portfolio Process of General User)

Figure 35:
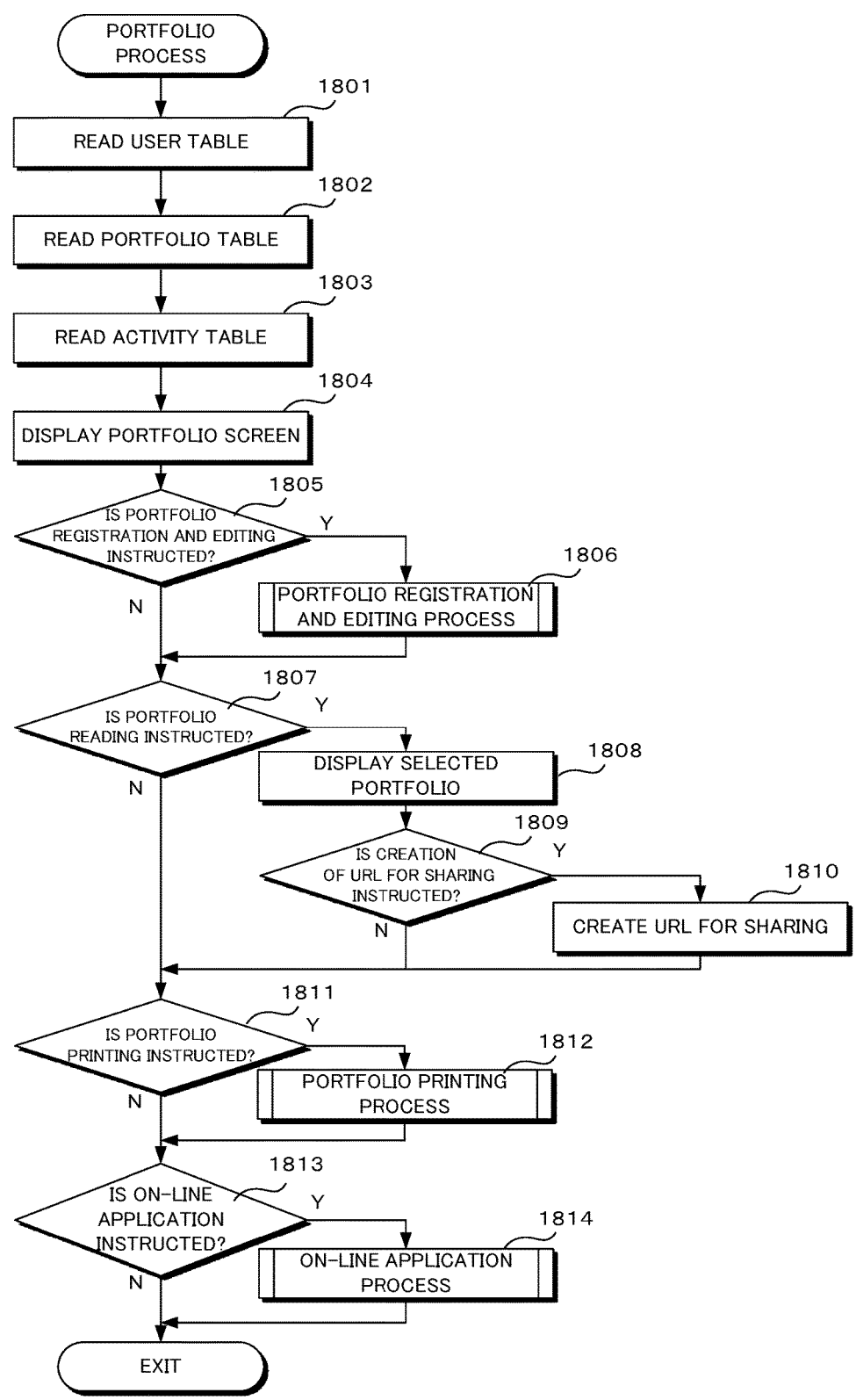
FIG. 35 is a flowchart illustrating an operation of a portfolio process.

FIG. 35 is a flowchart illustrating an operation of a portfolio process. As shown in FIG. 35, in step 1801, the control unit 101 reads the user table 205 based on a user ID.

In step 1802, the control unit 101 reads the portfolio table 212 based on the user ID.

In step 1803, the control unit 101 reads the activity table 206 based on the user ID.

In step 1804, the control unit 101 displays a portfolio screen on the display unit of the user terminal 41. The control unit 101 displays a list of portfolios read on the portfolio screen. Further, on the portfolio screen, buttons of "portfolio registration and editing", "portfolio reading", "portfolio printing", and "on-line submission" are displayed.

In step 1805, the control unit 101 determines whether portfolio registration and editing is instructed. In a case where it is determined that the portfolio registration and editing is instructed (Y in step 1805), the control unit 101 causes the procedure to proceed to step 1806, and in a case where it is determined that the portfolio registration and editing is not instructed (N in step 1805), the control unit 101 causes the procedure to proceed to step 1807.

In step 1806, the control unit 101 executes a portfolio registration and editing process, and then, causes the procedure to proceed to step 1807.

In step 1807, the control unit 101 determines whether portfolio reading is instructed. In a case where it is determined that the portfolio reading is instructed (Y in step 1807), the control unit 101 causes the procedure to proceed to step 1808, and in a case where it is determined that the portfolio reading is not instructed (N in step 1807), the control unit 101 causes the procedure to proceed to step 1811.

In step 1808, the control unit 101 displays content of a selected portfolio.

In step 1809, the control unit 101 determines whether creation of a URL for sharing is instructed. In a case where it is determined that the creation of the URL for sharing is instructed (Y in step 1809), the control unit 101 causes the procedure to proceed to step 1810, and in a case where it is determined that the creation of the URL for sharing is not instructed (N in step 1809), the control unit 101 causes the procedure to proceed to step 1811.

In step 1810, the control unit 101 creates a URL for sharing, displays the created URL for sharing on the display unit of the user terminal 41, and then, causes the procedure to proceed to step 1811.

In step 1811, the control unit 101 determines whether portfolio printing is instructed. In a case where it is determined that the portfolio printing is instructed (Y in step 1811), the control unit 101 causes the procedure to proceed to step 1812, and in a case where it is determined that the portfolio printing is not instructed (N in step 1811), the control unit 101 causes the procedure to proceed to step 1813.

In step 1812, the control unit 101 executes a portfolio printing process, and then, causes the procedure to proceed to step 1813.

In step 1813, the control unit 101 determines whether on-line application is instructed. In a case where it is determined that the on-line application is instructed (Y in step 1813), the control unit 101 causes the procedure to proceed to step 1814, and in a case where it is determined that the on-line application is not instructed (N in step 1813), the control unit 101 passes through the process.

In step 1814, the control unit 101 executes an on-line application process, and then, passes through the process.

Figure 36:
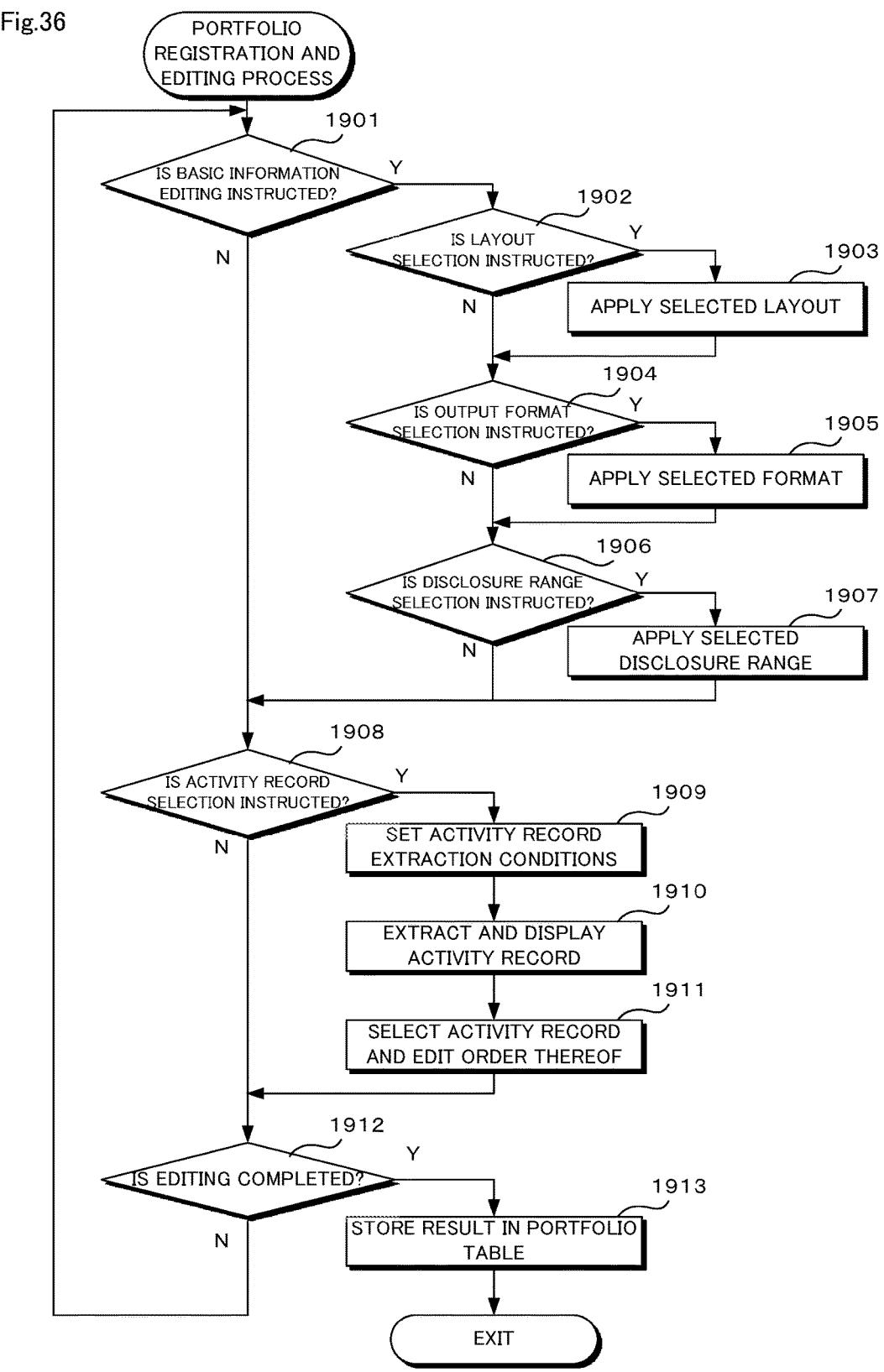
FIG. 36 is a flowchart illustrating an operation of a portfolio registration and editing process.

FIG. 36 is a flowchart illustrating an operation of a portfolio registration and editing process. As shown in FIG. 36, in step 1901, the control unit 101 determines whether basic information editing is instructed. In a case where it is determined that the basic information editing is instructed (Y in step 1901), the control unit 101 causes the procedure to proceed to step 1902, and in a case where it is determined that the basic information editing is not instructed (N in step 1901), the control unit 101 causes the procedure to proceed to step 1908.

In step 1902, the control unit 101 determines whether layout selection is instructed. In a case where it is determined that the layout selection is instructed (Y in step 1902), the control unit 101 causes the procedure to proceed to step 1903, and in a case where it is determined that the layout selection is not instructed (N in step 1902), the control unit 101 causes the procedure to proceed to step 1904.

In step 1903, the control unit 101 applies a selected layout to a portfolio.

In step 1904, the control unit 101 determines whether output format selection is instructed. In a case where it is determined that the output format selection is instructed (Y in step 1904), the control unit 101 causes the procedure to proceed to step 1905, and in a case where it is determined that the output format selection is not instructed (N in step 1904), the control unit 101 causes the procedure to proceed to step 1906.

In step 1905, the control unit 101 applies a selected format to a portfolio.

In step 1906, the control unit 101 determines whether disclosure range selection is instructed. In a case where it is determined that the disclosure range selection is instructed (Y in step 1906), the control unit 101 causes the procedure to proceed to step 1907, and in a case where it is determined that the disclosure range selection is not instructed (N in step 1906), the control unit 101 causes the procedure to proceed to step 1908.

In step 1907, the control unit 101 applies a selected disclosure range. Here, the disclosure range may be selected from "on the Internet", "within the same organization", "within the same group", and "only a host user".

In step 1908, the control unit 101 determines whether activity record selection is instructed. In a case where it is determined that the activity record selection is instructed (Y in step 1908), the control unit 101 causes the procedure to proceed to step 1909, and in a case where it is determined that the activity record selection is not instructed (N in step 1908), the control unit 101 causes the procedure to proceed to step 1912.

In step 1909, the control unit 101 causes a general user to input a setting for extraction conditions of an activity record.

In step 1910, the control unit 101 retrieves the activity table 206 based on designated conditions, extracts a corresponding activity record, and displays the result on the display unit of the user terminal 41.

In step 1911, the control unit 101 causes a general user to perform selection of an activity record to be added to a portfolio and editing of the order thereof.

In step 1912, the control unit 101 determines whether editing is completed. In a case where it is determined that there is an indication showing that the editing is completed (Y in step 1912), the control unit 101 causes the procedure to proceed to step 1913, and in a case where it is determined that there is no indication showing that the editing is completed (N in step 1912), the control unit 101 causes the procedure to return to step 1901.

In step 1913, the control unit 101 stores editing content in the portfolio table 212, and then, passes through the process.

Figure 37:
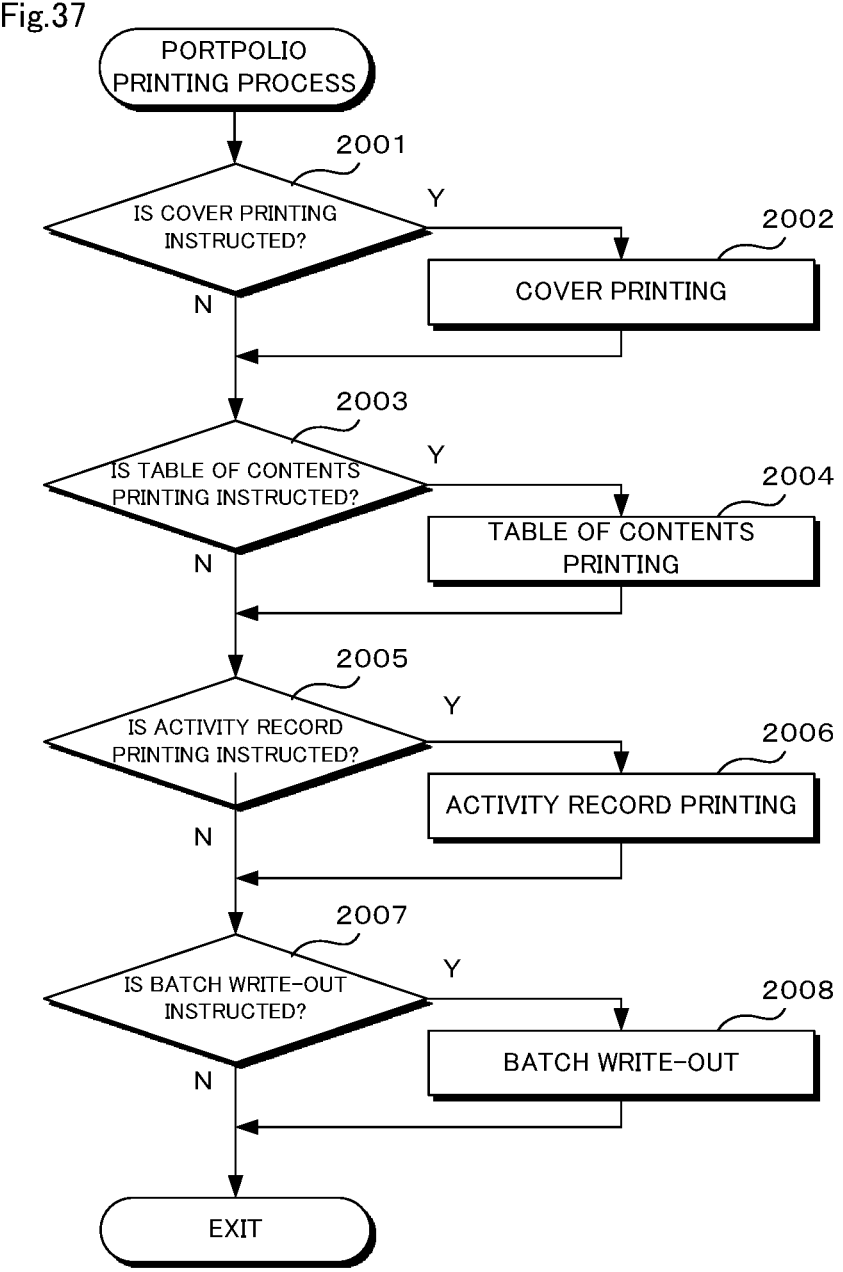
FIG. 37 is a flowchart illustrating an operation of a portfolio printing process.

FIG. 37 is a flowchart illustrating an operation of a portfolio printing process. As shown in FIG. 37, in step 2001, the control unit 101 determines whether there is an instruction for printing a cover. In a case where it is determined that there is the instruction for printing the cover (Y in step 2001), the control unit 101 causes the procedure to proceed to step 2002, and in a case where it is determined that there is no instruction for printing the cover (N in step 2001), the control unit 101 causes the procedure to proceed to step 2003.

In step 2002, the control unit 101 prints the cover.

In step 2003, the control unit 101 determines whether there is an instruction for printing a table of contents. In a case where it is determined that there is the instruction for printing the table of the contents (Y in step 2003), the control unit 101 causes the procedure to proceed to step 2004, and in a case where it is determined that there is no instruction for printing the table of the contents (N in step 2003), the control unit 101 causes the procedure to proceed to step 2005.

In step 2004, the control unit 101 prints the contents.

In step 2005, the control unit 101 determines whether there is an instruction for printing an activity record. In a case where it is determined that there is the instruction for printing the activity record (Y in step 2005), the control unit 101 causes the procedure to proceed to step 2006, and in a case where it is determined that there is no instruction for printing the activity record (N in step 2005), the control unit 101 causes the procedure to proceed to step 2007.

In step 2006, the control unit 101 prints the activity record.

In step 2007, the control unit 101 determines whether there is an instruction for performing batch write-out. In a case where it is determined that there is the instruction for performing the batch write-out (Y in step 2007), the control unit 101 causes the procedure to proceed to step 2008, and in a case where it is determined that there is no instruction for performing the batch write-out (N in step 2007), the control unit 101 passes through the process.

In step 2008, the control unit 101 outputs details of a portfolio as a file designated in a form selected from a word processor software form and a PDF form.

Figure 38:
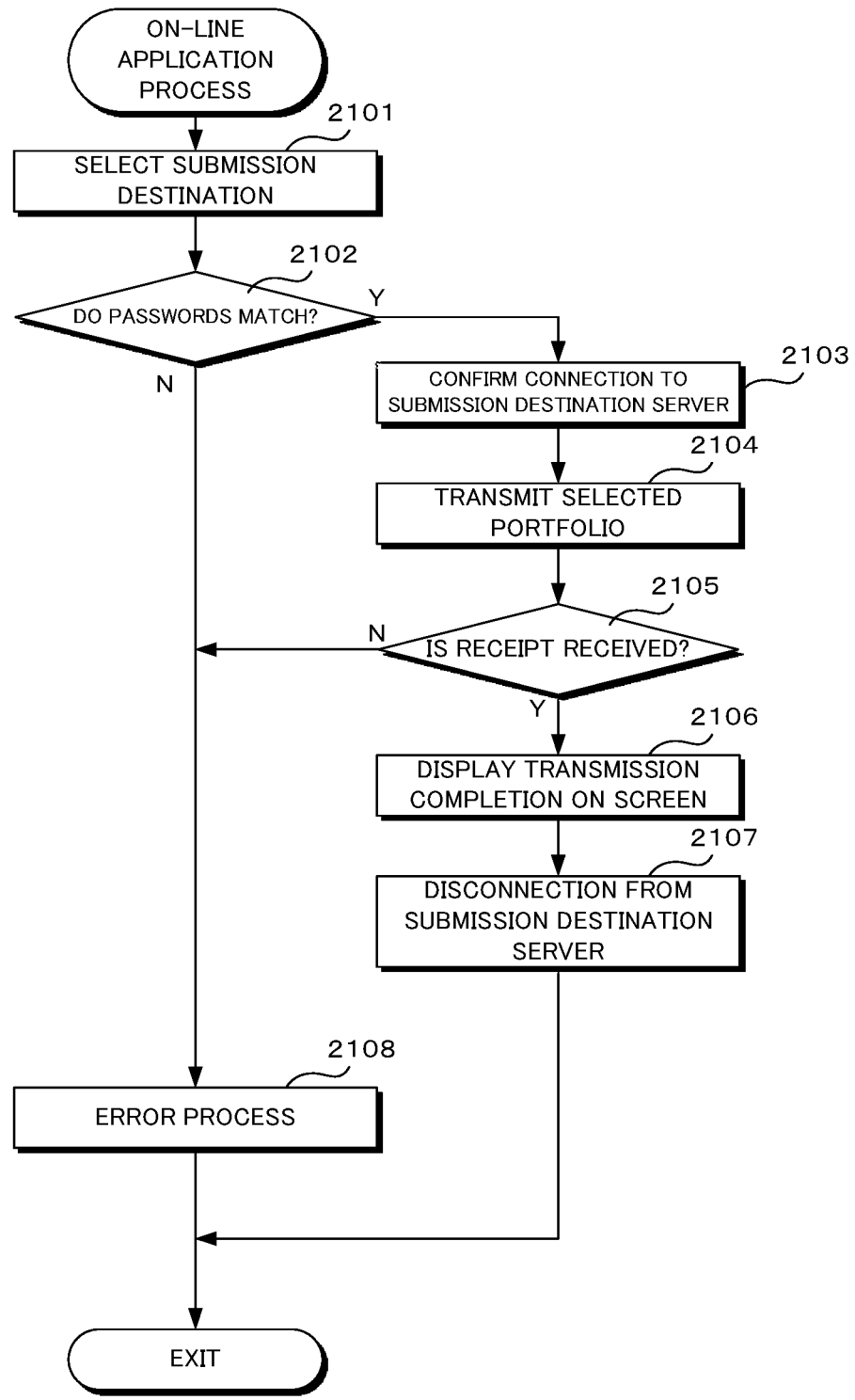
FIG. 38 is a flowchart illustrating an operation of an on-line application process.

FIG. 38 is a flowchart illustrating an operation of an on-line application process. As shown in FIG. 38, in step 2101, the control unit 101 causes a general user to select a submission destination.

In step 2102, the control unit 101 requests input of a password for confirmation, and determines whether the input password matches a password stored in the user table 205. In a case where it is determined that the passwords match each other (Y in step 2102), the control unit 101 causes the procedure to proceed to step 2103, and in a case where it is determined that the passwords do not match each other (N in step 2102), the control unit 101 causes the procedure to proceed to step 2108.

In step 2103, the control unit 101 starts communication with a submission target server, and ensures connection.

In step 2104, the control unit 101 transmits a selected portfolio to the submission destination server.

In step 2105, the control unit 101 determines whether a receipt is received from the submission destination server. In a case where it is determined that the receipt is received (Y in step 2105), the control unit 101 causes the procedure to proceed to step 2106, and in a case where it is determined that the receipt is not received (N in step 2105), the control unit 101 causes the procedure to proceed to step 2108.

In step 2106, the control unit 101 displays transmission completion on the display unit of the user terminal 41.

In step 2107, the control unit 101 disconnects the communication from the submission destination server.

In step 2108, the control unit 101 performs an error process.

(Task Process of General User)

Figure 39:
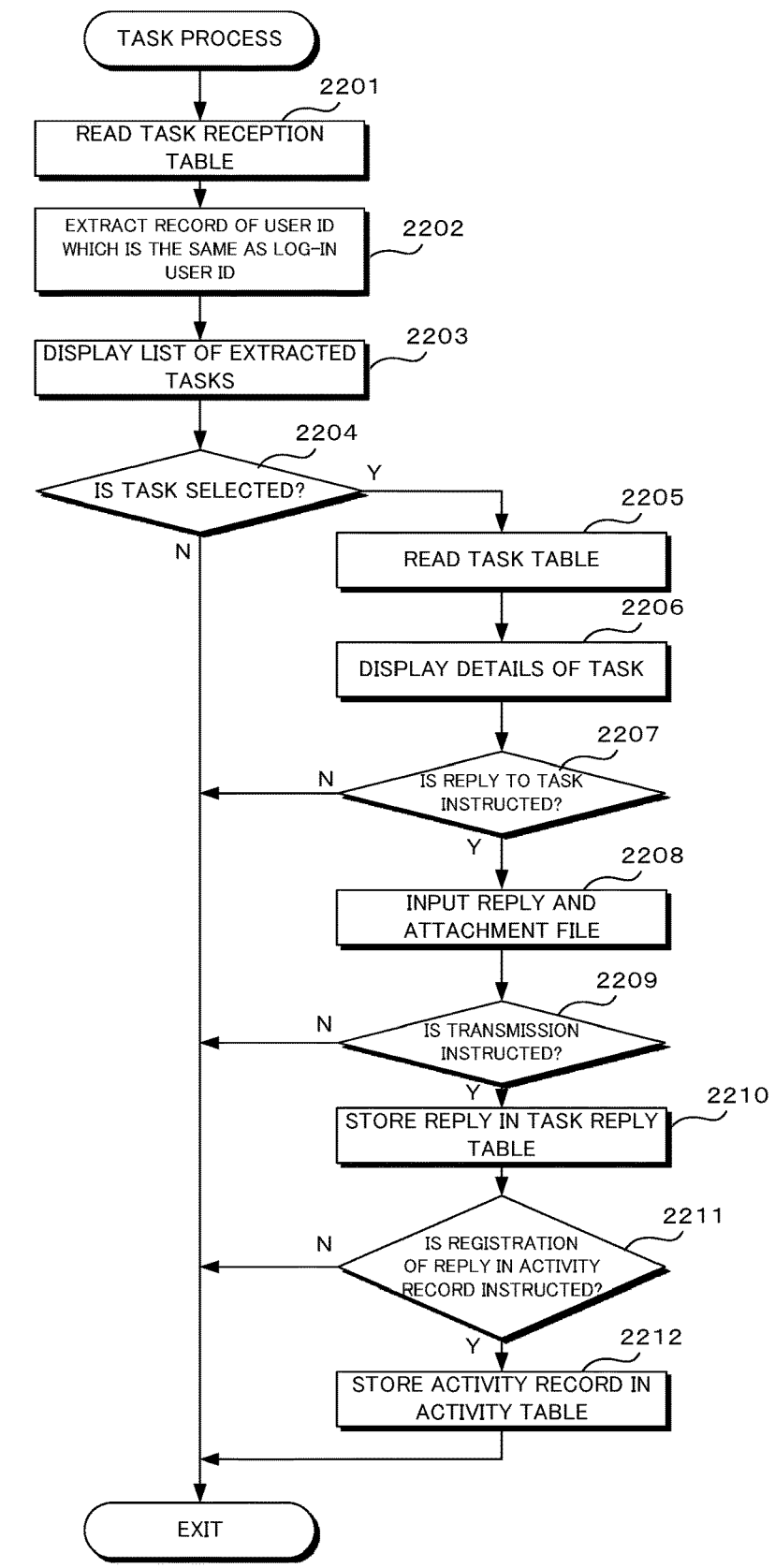
FIG. 39 is a flowchart illustrating an operation of a task process.

FIG. 39 is a flowchart illustrating an operation of a task process. As shown in FIG. 39, in step 2201, the control unit 101 reads a task reception table.

In step 2202, the control unit 101 extracts a record of a user ID which is the same as a logged-in user, from the read records.

In step 2203, the control unit 101 displays a list of extracted tasks on the display unit of the user terminal 41.

In step 2204, the control unit 101 determines whether a task is selected. In a case where it is determined that the task is selected (Y in step 2204), the control unit 101 causes the procedure to proceed to step 2205, and in a case where it is determined that the task is not selected (N in step 2204), the control unit 101 passes through the process.

In step 2205, the control unit 101 reads the task table 215 based on a task serial number of the selected task.

In step 2206, the control unit 101 displays details of the selected task on the display unit of the user terminal 41.

In step 2207, the control unit 101 determines whether there is an instruction for replying the task. In a case where it is determined that there is the instruction for replying the task (Y in step 2207), the control unit 101 causes the procedure to proceed to step 2208, and in a case where it is determined that there is no instruction for replying the task (N in step 2207), the control unit 101 passes through the process.

In step 2208, the control unit 101 causes a general user to input a reply, and to input designation of an attachment file.

In step 2209, the control unit 101 determines whether there is an instruction for transmission. In a case where it is determined that there is the instruction for transmission (Y in step 2209), the control unit 101 causes the procedure to proceed to step 2210, and in a case where it is determined that there is no instruction for transmission (N in step 2209), the control unit 101 passes through the process.

In step 2210, the control unit 101 stores content of the reply to the task in the task reply table 217.

In step 2211, the control unit 101 determines whether there is an instruction for registering the reply to the task in an activity record. In a case where it is determined that there is the instruction for registering the reply to the task in the activity record (Y in step 2211), the control unit 101 causes the procedure to proceed to step 2212, and in a case where it is determined that there is no instruction for registering the reply to the task in the activity record (N in step 2211), the control unit 101 passes through the process.

In step 2212, the control unit 101 stores the activity record in the activity table 206, and then, passes through the process.

(Network Process of General User)

An operation of a network process of a general user is the same as the operation of the operator network process shown in FIG. 23.

(Adviser Process)

The adviser process is the same as the general user process, except for the following points.

An output destination becomes the adviser terminal 43.

In the adviser network process, an adviser is capable of performing "approved" with respect to a general user, and performing registration and editing of a group. Specifically, in the adviser network process, instead of step 609 and step 610 which are operations of the operator network process shown in FIG. 23, the same operations as step 1201 to step 1212 which are operations of the organization network process shown in FIG. 29 are executed. If the general user is "approved", the general user can use the portfolio creation system.

In the adviser network process, a list of general users who submit a task and general users who do not submit the task, in the task process, can be displayed to be distinguished. Registration and editing of the task can be performed.

(Link to Other Social Network Services (SNS))

The portfolio creation system may be linked to other SNS. Herein, an example thereof will be described.

(Contribution to Other SNS)

On an activity record and portfolio reading screen, a "contribution to other SNS" button and a "generation of a URL for sharing" button may be provided.

In this case, the user table 205 stores a target URL which is a URL of a page of other SNS possessed by a logged-in general user or an adviser.

If the "contribution to other SNS" button is clicked, the control unit 101 opens a page of the target URL using a separate window or a separate tab.

If the "URL for sharing" button is clicked, the control unit 101 copies a contribution file of a designated activity record or portfolio into an FTP server which is separately provided in the portfolio creation system, discloses the copy in a designated disclosure range, and displays a URL of the contribution file on a display unit of a terminal used by a log-in user. The contribution file is stored in the FTP server in a format to be capable of being pasted to other SNS, for example, in a format of an HTML or the like.

By copying the URL and pasting the URL onto a page of other SNS which is opened, it is possible to contribute an activity record or a portfolio to other SNS.

(Copy from Other SNS)

On an activity record registration and editing screen, it is possible to copy and paste an image or text displayed in other SNS.

(Description about Screen)

Respective screens shown hereinafter are only examples, and details to be displayed may be appropriately deleted or added.

Figure 40:
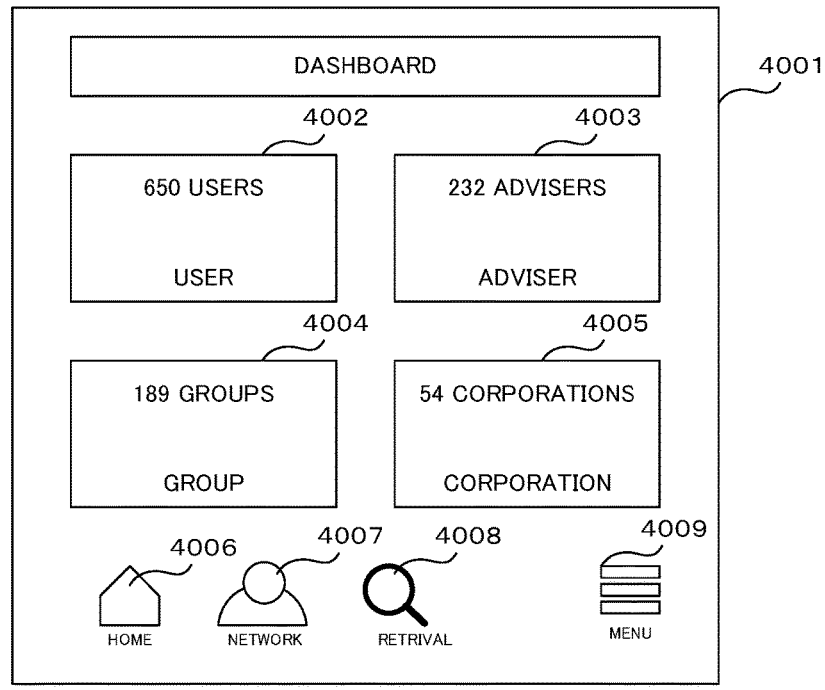
FIG. 40 is a diagram illustrating an operator dashboard.

FIG. 40 is a diagram illustrating an operator dashboard 4001. As shown in FIG. 40, the operator dashboard 4001 includes a user list display button 4002, an adviser list display button 4003, a group list display button 4004, an organization list display button 4005, a "home" button 4006, a "network" button 4007 for instructing starting of an operator network process, a "retrieval" button 4008 for instructing starting of a retrieval process, and a "menu" button 4009.

Figure 41:
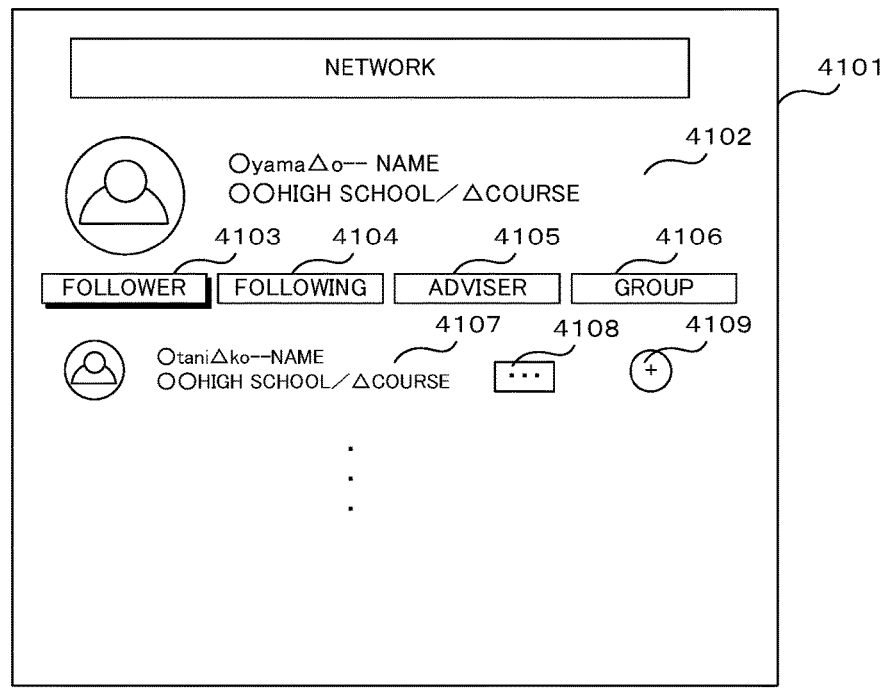
FIG. 41 is a diagram illustrating a network screen.

FIG. 41 is a diagram illustrating a network screen 4101. A configuration of the network screen 4101 is the same as configurations of an operator network screen, an organization network screen, a general user network screen, and an adviser network screen.

As shown in FIG. 41, the network screen 4101 includes a log-in user column 4102 indicating a log-in user, a "follower" button 4103, a "following" button 4104, an "adviser" button 4105, a "group" button 4106, a member details column 4107 indicating details about a member, a comment button 4108, and a "follow" button 4109 for supporting an intention to follow a displayed member.

Figure 42:
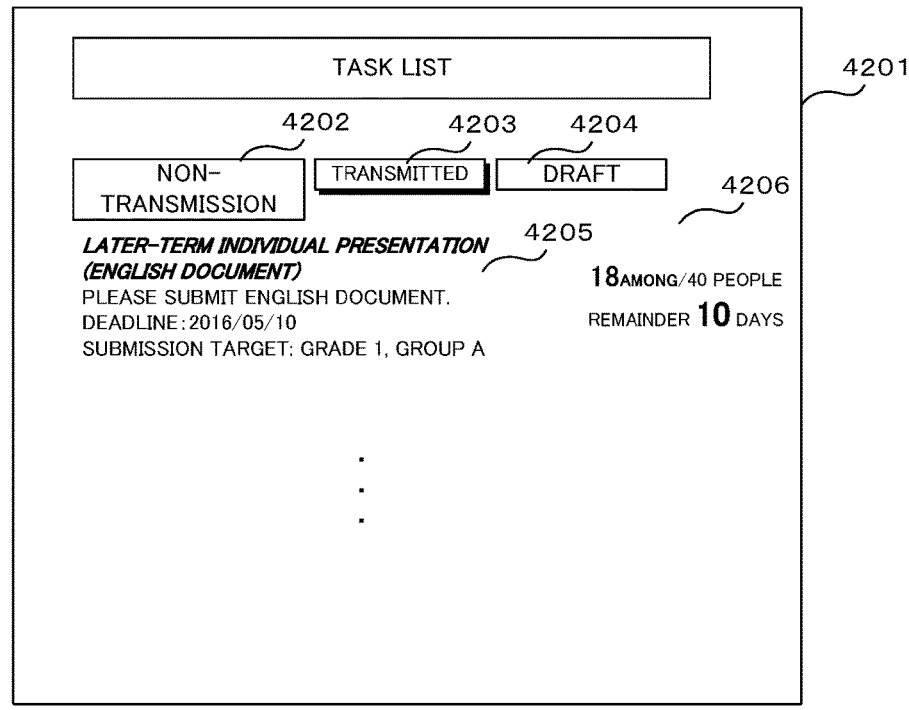
FIG. 42 is a diagram illustrating a task management screen.

FIG. 42 is a diagram illustrating a task management screen 4201. As shown in FIG. 42, the task management screen 4201 includes a "non-transmission" button 4202, a task column 4205 for displaying a tile of a task, and a submission situation column 4206 for indicating a submission situation of the task.

Figure 43:
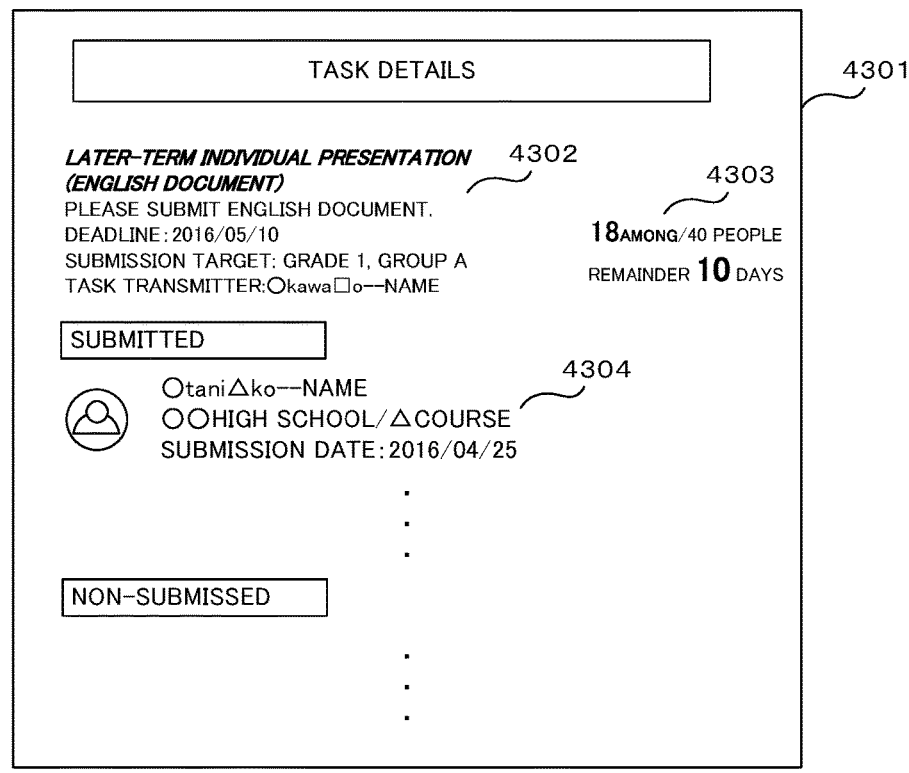
FIG. 43 is a diagram illustrating a task management details screen.

FIG. 43 is a diagram illustrating a task management details screen 4301. As shown in FIG. 43, the task management details screen 4301 includes a task column 4302 indicating a title of a task, a submission situation column 4303 indicating a submission situation of the task, and a submitter list display column 4304 where a list of submitters and non-submitters is displayed.

Figure 44:
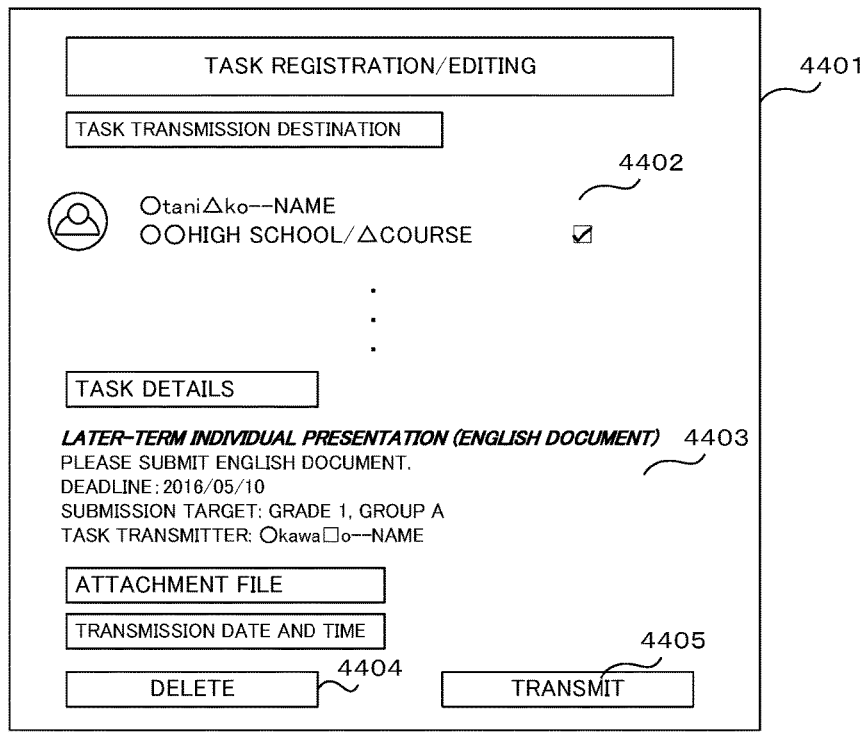
FIG. 44 is a diagram illustrating a task registration and editing screen.

FIG. 44 is a diagram illustrating a task registration and editing screen 4401. As shown in FIG. 44, the task registration and editing screen 4401 includes a task transmission destination details column 4402 indicating a transmission destination of a task, a task details column 4403 indicting details about the task, a "delete" button 4404 for instructing deletion of the task, and a "transmit" button 4405 for instructing transmission of the task.

Figure 45:
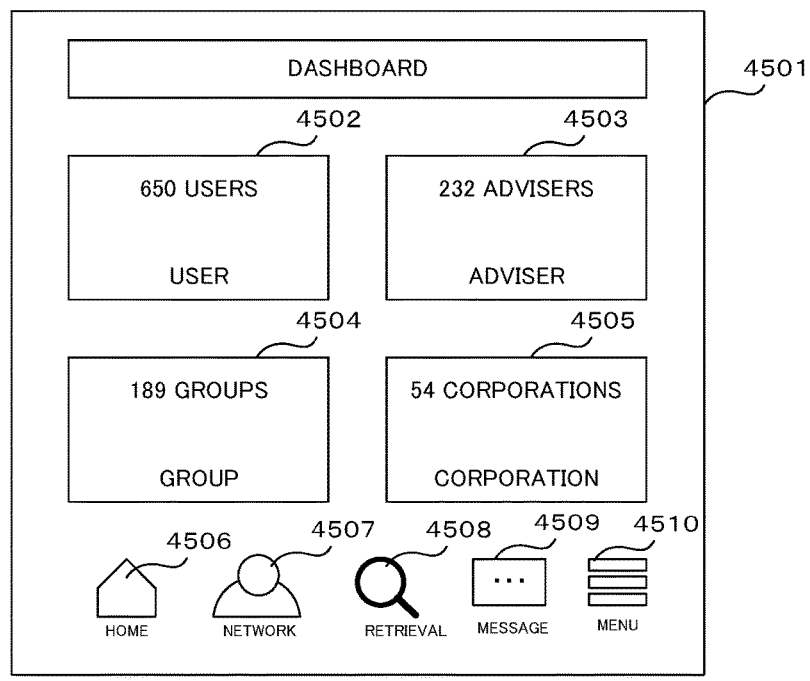
FIG. 45 is a diagram illustrating a dashboard other than the operator dashboard.

FIG. 45 is a diagram illustrating a dashboard 4501 other than an operator dashboard. As shown in FIG. 45, the dashboard 4501 includes a user list display button 4502, an adviser list display button 4503, a group list display button 4504, an organization list display button 4505, a "home" button 4506, a "network" button 4507 for instructing starting of a network process, a "retrieval" button 4508 for instructing starting of a retrieval process, a "message" button 4509 for instructing starting of a message process, and a "menu" button 4510.

Figure 46:
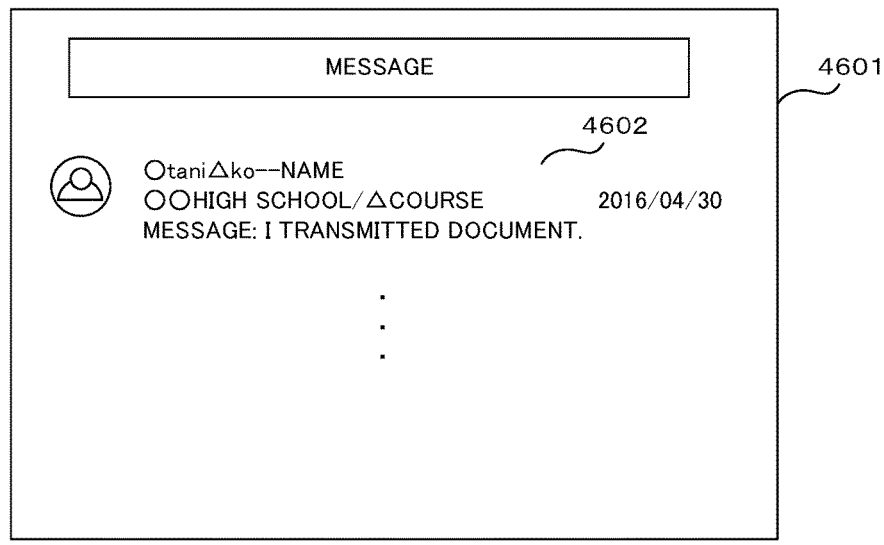
FIG. 46 is a diagram illustrating a message screen.

FIG. 46 is a diagram illustrating a message screen 4601. As shown in FIG. 46, the message screen 4601 includes a chat room list column 4602 indicating a list of chat rooms.

Figure 47:
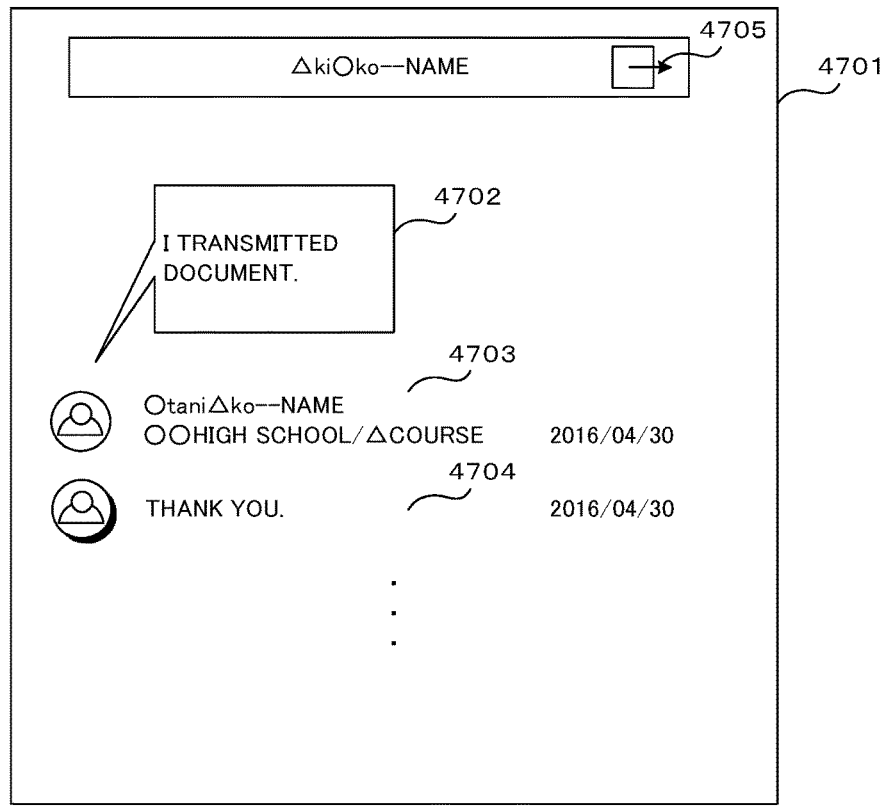
FIG. 47 is a diagram illustrating a chat room screen.

FIG. 47 is a diagram illustrating a chat room screen 4701. As shown in FIG. 47, the chat room screen 4701 includes a message balloon 4702, a write user column 4703 indicating a user who writes a message, a host user message column 4704 indicating a message of a host user, and an exit room button 4705 for instructing room exit.

Figure 48:
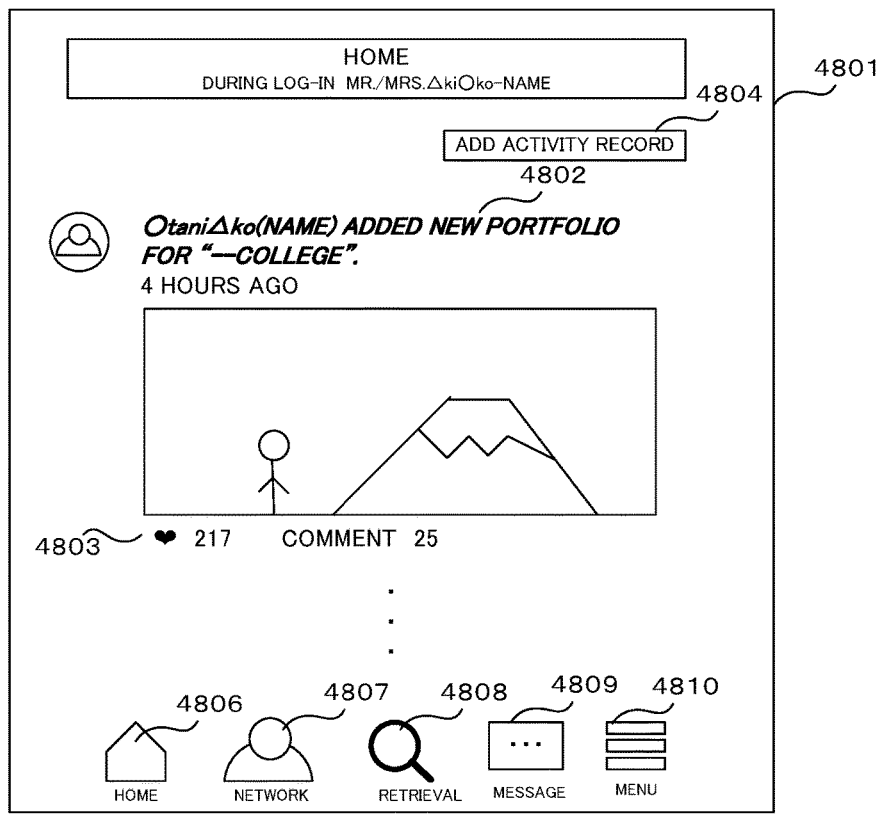
FIG. 48 is a diagram illustrating a wall.

FIG. 48 is a diagram illustrating a wall 4801. As shown in FIG. 48, the wall 4801 includes an abstract column 4802 indicating an abstract of an activity record or the like, a good evaluation added-up value 4803 displayed in each abstract, an "add activity record" button 4804 for instructing addition of an activity record, a "home" button 4806, a "network" button 4807 for instructing starting of a network process, a "retrieval" button 4808 for instructing starting of a retrieval process, a "message" button 4809 for instructing starting of a message process, and a "menu" button 4810.

Figure 49:
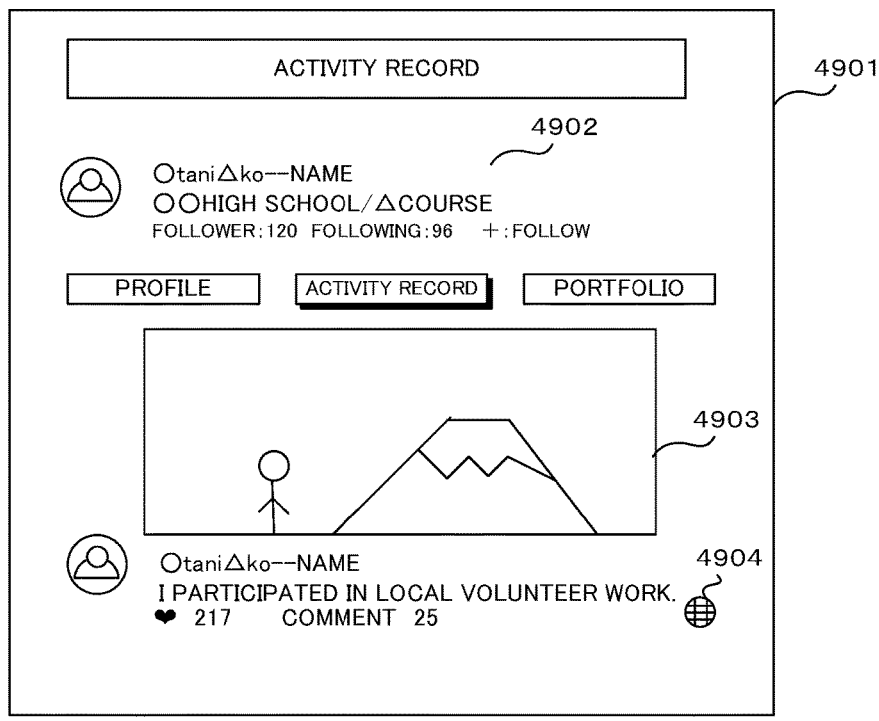
FIG. 49 is a diagram illustrating an activity record screen.

FIG. 49 is a diagram illustrating an activity record screen 4901. As shown in FIG. 49, the activity record screen 4901 includes a user column 4902 indicating a general user, an activity record details column 4903 indicating details of an activity record, and a disclosure range icon 4904 indicating a disclosure range of a displayed activity record.

Figure 50:
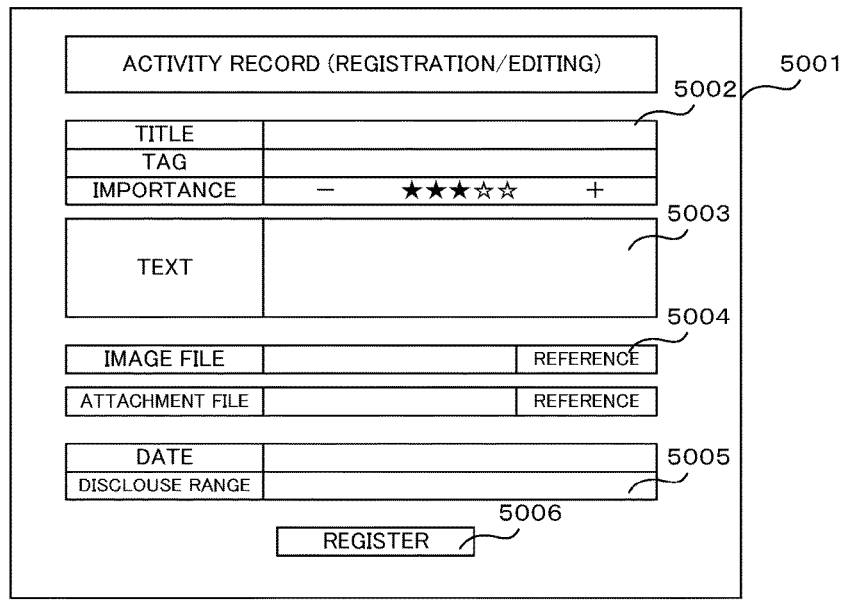
FIG. 50 is a diagram illustrating an activity record editing and registration screen.

FIG. 50 is a diagram illustrating an activity record editing and registration screen 5001. As shown in FIG. 50, the activity record and registration screen 5001 includes a basic item column 5002, a text column 5003 indicating a text of an activity record, a reference button 5004 for selecting a path of an image file to be attached and an attachment file, and a disclosure range column 5005 for selecting and instructing a disclosure range of a displayed activity record, and a "registration" button 5006 for instructing registration.

Figure 51:
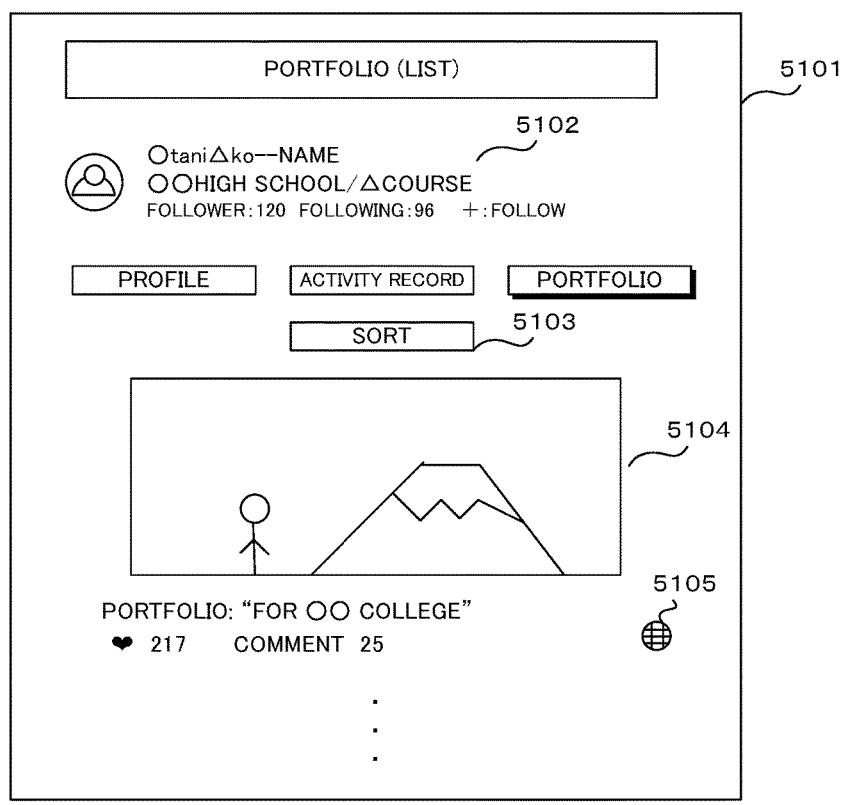
FIG. 51 is a diagram illustrating a portfolio screen.

FIG. 51 is a diagram illustrating a portfolio screen 5101. As shown in FIG. 51, the portfolio screen 5101 includes an owner column 5102 indicating an owner user of a portfolio, a "sort" button 5103 for instructing sorting of activity records, an activity record column 5104 indicating details of an activity record, and a disclosure range icon 5105 indicating a disclosure range of a portfolio which is being displayed.

Figure 52:
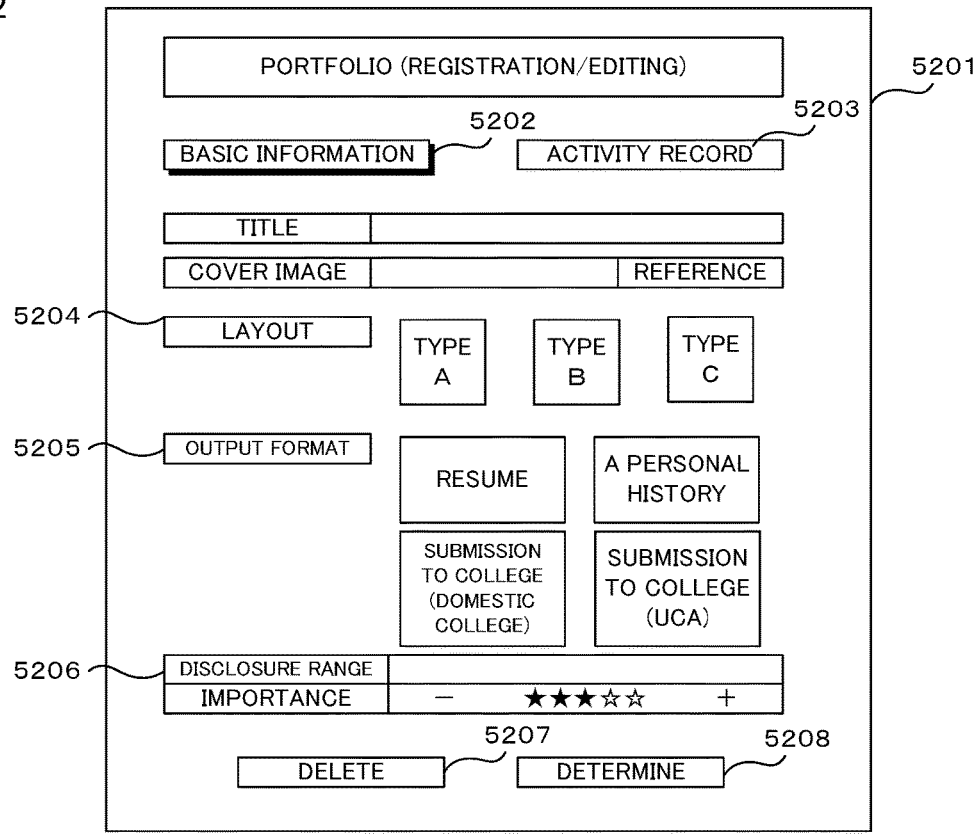
FIG. 52 is a diagram illustrating a portfolio registration and editing screen (basic information).

FIG. 52 is a diagram illustrating a portfolio registration and editing screen (basic information) 5201. As shown in FIG. 52, the portfolio registration and editing screen (basic information) 5201 includes a "basic information" button 5202 for instructing editing of basic information, an "activity record" button 5203 for instructing editing of an activity record, a layout column 5204 for instructing layout selection, an output format column 5205 for selecting and instructing an output format, a disclosure range column 5206 for selecting and instructing a disclosure range of a portfolio, a "delete" button 5207 for instructing deletion, and a "determine" button 5208 for instructing registration.

Figure 53:
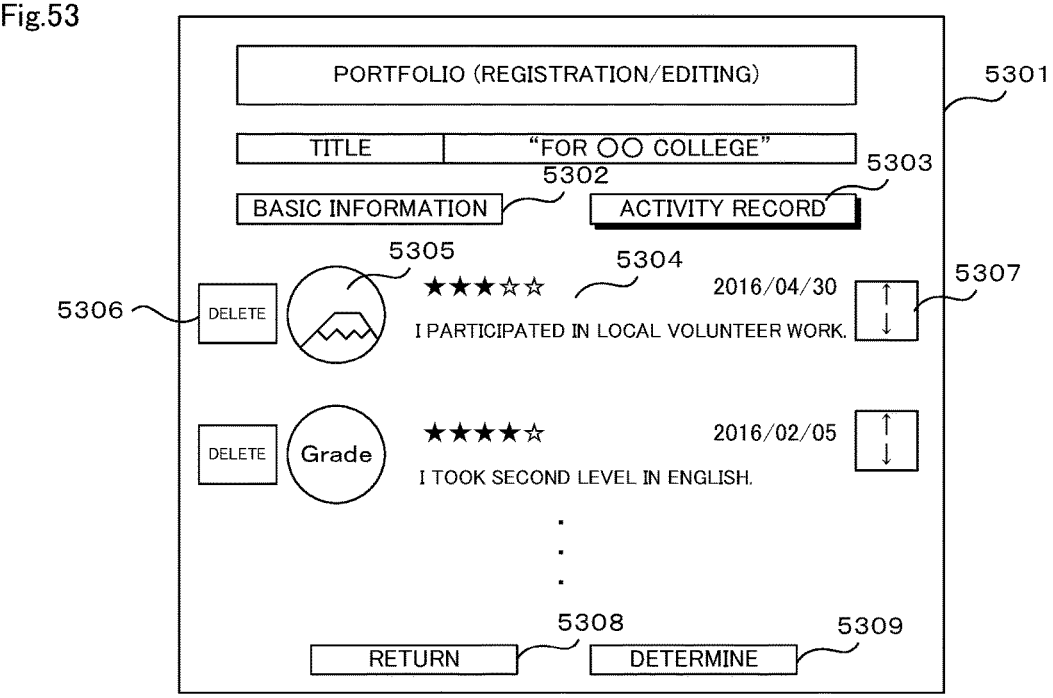
FIG. 53 is a diagram illustrating a portfolio registration and editing screen (activity record).

FIG. 53 is a diagram illustrating a portfolio registration and editing screen (activity record) 5301. As shown in FIG. 53, the portfolio registration and editing screen (activity record) 5301 includes a "basic information" button 5302 for instructing editing of basic information, an "activity record" button 5303 for instructing editing of an activity record, an activity record abstract column 5304 indicating an abstract of the activity record, a thumbnail image 5305 that thumbnails an image included in the activity record, a "delete" button 5306 for instructing deletion of the activity record from a portfolio, an order change button 5307 for instructing changing of the order of the activity record, a "return" button 5308 for returning to a previous screen, and a "determine" button 5309 for instructing registration of the portfolio.

Figure 54:
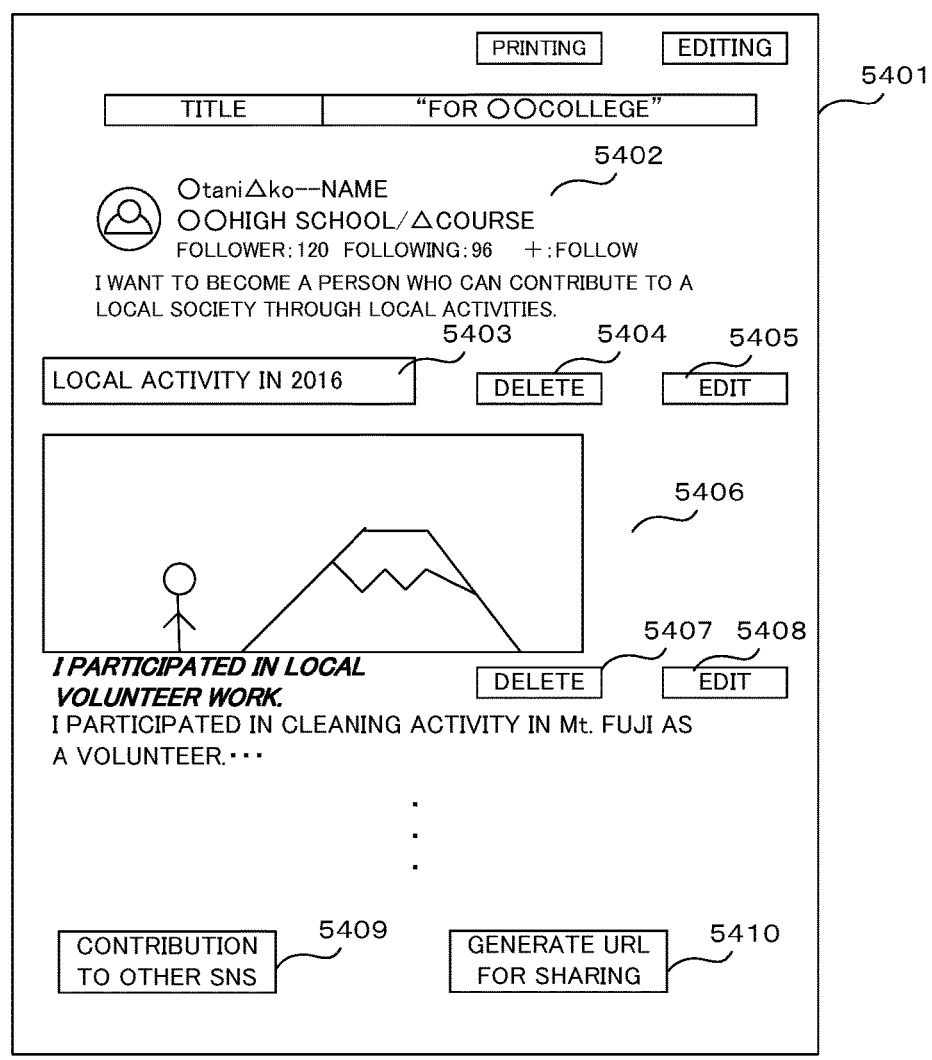
FIG. 54 is a diagram illustrating a portfolio reading screen.

FIG. 54 is a diagram illustrating a portfolio read screen 5401. As shown in FIG. 54, the portfolio read screen 5401 includes an owner user column 5402 indicating an owner user of a portfolio, a section column 5403 indicating a section for clustering plural activity records, a section column "delete" button 5404 indicating deletion of a section column, a section column "edit" button 5405 for instructing editing of a section column, an activity record details column 5406 indicating details of an activity record, an activity record "delete" button 5407 for instructing deletion of the activity record from a portfolio, an activity record "edit" button 5408 for instructing editing of the activity record, a "contribution to other SNS" button 5409 for instructing contribution of the portfolio to other SNS, and a "URL for sharing" button 5410 for instructing generation of a URL for sharing.

As described above, the portfolio creation system of this embodiment includes an approval storage table (group user table 211) that stores an approval determined by an adviser who determines approval or disapproval of registration of a user, for each user, an authentication unit (step 404 in FIG. 21) that prohibits use of a user who is not given the approval and allows use of an approved user who is given the approval, a user table 205 that stores information relating to the approved user, an activity table 206 that stores an activity record which is a record of an activity of the approved user, a portfolio table 212 that stores a portfolio including information about of the approved user and a record of an activity of the approved user, an activity record display unit (activity record process) that displays the activity record in a selectable form, and a portfolio creation unit (portfolio process) that creates a portfolio based on the information relating to the approved user and the selected activity record and stores the created portfolio in the portfolio table 212.

Accordingly, it is possible to provide a portfolio creation system capable of accumulating his/her own activity records by a simple operation, easily collecting the accumulated activity records in a portfolio, and preventing pretension of a third party.

Further, the portfolio creation system of this embodiment includes a user table 205 that stores information relating to a user, an activity table 206 that stores an activity record which is a record of an activity of the user, an activity evaluation table (activity comment table 207 and activity evaluation table 208) that stores an evaluation of a different user with respect to the activity record, a portfolio table 212 that stores a portfolio including information about the user and the activity record of the user, an activity record display unit (activity record process) that displays the activity record and the evaluation of the different user in a selectable form, and a portfolio creation unit (portfolio process) that creates a portfolio based on the information relating to the user and the selected activity record and stores the generated portfolio in the portfolio table 212.

Further, the portfolio creation system of this embodiment includes a user table 205 that stores information relating to a user, an activity table 206 that stores an activity record which is a record of an activity of the user, a message unit (message process) that performs exchange of a message in a chat room started by the user, an in-message activity record display unit that displays, in a case where a user who is displayed together with a comment by the message unit and has performed writing is designated, the activity record of the designated user, a portfolio table 212 that stores a portfolio including information about the user and the activity record of the user, an activity record display unit (activity record process) that displays the activity record in a selectable form, and a portfolio creation unit (portfolio process) that creates a portfolio based on the information relating to the user and the selected activity record and stores the generated portfolio in the portfolio table 212.

Accordingly, it is possible to mutually make reference to evaluations or comments of other users with respect to an activity record of a host user, and to create a more objective portfolio.

REFERENCE SIGNS LIST 1 head office
2 Internet
10 main server
20 database server
30 e-mail server
41 user terminal
42 organization terminal
43 adviser terminal
44 scout terminal
45 operator terminal
46 college server
201 operator table
202 organization table
203 organization user table
204 group table
205 user table
206 activity table
207 activity comment table
208 activity evaluation table
209 follow table
210 adviser table
211 group user table
212 portfolio table
213 portfolio comment table
214 portfolio evaluation table
215 task table
216 task reception table
217 task reply table
218 chat room table
219 chat message table FIG. 1
41 USER TERMINAL
42 ORGANIZATION TERMINAL
43 ADVISER TERMINAL
44 SCOUT TERMINAL
45 OPERATOR TERMINAL
46 DOMESTIC OR FOREIGN COLLEGE SERVER
1 HEAD OFFICE
10 MAIN SERVER
101 CONTROL UNIT
30 E-MAIL SERVER
20 DATABASE SERVER
201 OPERATOR TABLE
202 ORGANIZATION TABLE
203 ORGANIZATION USER TABLE
204 GROUP TABLE
205 USER TABLE
206 ACTIVITY TABLE
207 ACTIVITY COMMENT TABLE
208 ACTIVITY EVALUATION TABLE
209 FOLLOW TABLE
210 ADVISER TABLE
211 GROUP USER TABLE
212 PORTFOLIO TABLE
213 PORTFOLIO COMMENT TABLE
214 PORTFOLIO EVALUATION TABLE
215 TASK TABLE
216 TASK RECEPTION TABLE
217 TASK REPLY TABLE
218 CHAT ROOM TABLE
219 ROOM MEMBER TABLE
220 CHAT MESSAGE TABLE

FIG. 2
OPERATOR TABLE
OPERATOR ID
OPERATOR NAME
ADDRESS

FIG. 3
ORGANIZATION TABLE
ORGANIZATION ID
ORGANIZATION NAME
ADDRESS
FIG. 4
ORGANIZATION USER TABLE
ORGANIZATION ID
USER ID
FIG. 5
GROUP TABLE
ORGANIZATION ID
GROUP ID
GROUP NAME
FIG. 6
USER TABLE
USER ID
USER TYPE
PASSWORD
E-MAIL ADDRESS
ORGANIZATION ID
NAME
ADDRESS
BIRTHDAY
FIG. 7
ACTIVITY TABLE
USER ID
ACTIVITY RECORD SERIAL NUMBER
TAG
TITLE
TEXT
DEGREE OF IMPORTANCE
IMAGE
ATTACHMENT FILE
VIDEO URL
DATE
DISCLOSURE RANGE
FIG. 8
ACTIVITY COMMENT TABLE
USER ID
ACTIVITY RECORD SERIAL NUMBER
COMMENT NUMBER
USER ID OF COMMENT WRITER
COMMENT CONTENT
DATE
FIG. 9
ACTIVITY EVALUATION TABLE
USER ID
ACTIVITY RECORD SERIAL NUMBER
GOOD EVALUATION USER ID
DATE
FIG. 10
FOLLOW TABLE
FOLLOWED USER ID
FOLLOWING USER ID
FIG. 11
ADVISER TABLE
ORGANIZATION ID
GROUP ID
ADVISER ID
ADVISER NAME
ADVISER E-MAIL ADDRESS
FIG. 12
GROUP USER TABLE
ORGANIZATION ID
GROUP ID
USER ID
APPROVAL STATUS
APPROVAL ADVISER ID
FIG. 13
PORTFOLIO TABLE
USER ID
PORTFOLIO NUMBER
PORTFOLIO NAME
PORTFOLIO DISPLAY ORDER
REGISTRATION DATE
UPDATED DATE
FIG. 14
PORTFOLIO COMMENT TABLE
USER ID
PORTFOLIO NUMBER
COMMENT NUMBER
COMMENT WRITER ID
COMMENT
REGISTRATION DATE
UPDATED DATE
FIG. 15
PORTFOLIO EVALUATION TABLE
USER ID
PORTFOLIO NUMBER
GOOD EVALUATION USER ID
DATE
FIG. 16
TASK TABLE
USER ID
TASK YEAR
TASK SERIAL NUMBER
ORGANIZATION ID
GROUP YEAR
GROUP ID
TASK TITLE
TASK SETTER USER ID
TASK TRANSMISSION DESTINATION USER ID
TASK TEXT
TASK ATTACHMENT FILE
TASK SUBMISSION PERIOD
TRANSMISSION DATE AND TIME SETTING FLAG
TRANSMISSION PERIOD
DATE
FIG. 17
TASK RECEPTION TABLE
USER ID
TASK YEAR
TASK SERIAL NUMBER
TASK SETTER USER ID
TASK TRANSMISSION DESTINATION USER ID
DATE
FIG. 18
TASK REPLY TABLE
TASK SETTER USER ID
TASK YEAR
TASK SERIAL NUMBER
SUBMITTER USER ID
TASK REPLY CONTENT
REPLY ATTACHMENT FILE
SUBMISSION DATE
FIG. 19
CHAT ROOM TABLE
ROOM NUMBER
CREATOR USER ID
REGISTRATION DATE
UPDATED DATE
ROOM MEMBER TABLE
ROOM NUMBER

PARTICIPANT USER ID
SERIAL NUMBER
REGISTRATION DATE
UPDATED DATE
FIG. 20
CHAT MESSAGE TABLE
ROOM NUMBER
MESSAGE NUMBER
CONTRIBUTOR USER ID
MESSAGE
PHOTO
REGISTRATION DATE
UPDATED DATE
FIG. 21
401 NEW USER REGISTRATION?
402 NEW USER REGISTRATION PROCESS
403 INPUT USER ID AND PASSWORD
404 AUTHENTICATION
405 IS USER TYPE OPERATOR?
406 OPERATOR PROCESS
407 IS USER TYPE ORGANIZATION?
408 ORGANIZATION PROCESS
409 IS USER TYPE ADVISER?
410 ADVISER PROCESS
411 IS USER TYPE GENERAL USER?
412 GENERAL USER PROCESS
413 ERROR PROCESS
FIG. 22
OPERATOR PROCESS
501 DISPLAY OPERATOR DASHBOARD
502 IS NETWORK PROCESS SELECTED?
503 OPERATOR NETWORK PROCESS
504 IS RETRIEVAL PROCESS SELECTED?
505 RETRIEVAL PROCESS
506 IS MENU SELECTED?
507 DISPLAY OPERATOR MENU
508 IS TASK MANAGEMENT SELECTED?
509 TASK MANAGEMENT PROCESS
510 IS ORGANIZATION MANAGEMENT SELECTED?
511 ORGANIZATION MANAGEMENT PROCESS
512 IS LIST DISPLAY SELECTED?
513 LIST DISPLAY PROCESS
FIG. 23
OPERATOR NETWORK PROCESS
601 DISPLAY OPERATOR NETWORK SCREEN
602 IS "FOLLOWER" SELECTED?
603 READ FOLLOW TABLE
604 DISPLAY FOLLOWERS FOR WHICH FOLLOWED USER ID IS THE SAME AS FOLLOWER USER ID
605 IS "ADVISER" SELECTED?
606 READ ORGANIZATION ID FROM USER TABLE
607 DISPLAY ADVISERS RELATING TO ORGANIZATION ID WHICH IS THE SAME AS READ ORGANIZATION ID
608 IS "GROUP" SELECTED?
609 READ GROUP NAME OF USER ID FROM GROUP USER TABLE
610 DISPLAY USER IDs OF READ GROUP NAME
FIG. 24
RETRIEVAL PROCESS
701 DISPLAY RETRIEVAL SCREEN
702 IS "PORTFOLIO" SELECTED?
703 RETRIEVE PORTFOLIO TABLE
704 DISPLAY RETRIEVAL RESULT
705 IS "USER" SELECTED?
706 RETRIEVE USER TABLE
707 DISPLAY RETRIEVAL RESULT
FIG. 25
TASK MANAGEMENT PROCESS
801 DISPLAY TASK MANAGEMENT SCREEN
802 READ TASK TABLE FOR LIST DISPLAY
803 DISPLAY DETAILS OF SELECTED TASK
804 DISPLAY SUBMITTERS AND NON-SUBMITTERS OF SELECTED TASK
805 EDITING MODE?
806 INPUT DETAILS OF SELECTED TASK
807 IS TRANSMISSION INSTRUCTED?
808 ADD RECORD TO TASK TABLE FOR EACH DESIGNATED USER
809 TRANSMIT E-MAIL TO DESIGNATED USER
FIG. 26
ORGANIZATION MANAGEMENT PROCESS
901 DISPLAY ORGANIZATION LIST (SCHOOL LIST) SCREEN
902 DISPLAY DETAILS OF SELECTED ORGANIZATION
903 INPUT DETAILED INFORMATION
904 INPUT LIMIT INFORMATION
905 STORE INPUT INFORMATION TO ORGANIZATION TABLE
FIG. 27
ORGANIZATION PROCESS
1001 DISPLAY ORGANIZATION DASHBOARD
1002 IS NETWORK PROCESS SELECTED?
1003 ORGANIZATION NETWORK PROCESS
1004 IS RETRIEVAL PROCESS SELECTED?
1005 RETRIEVAL PROCESS
1006 IS MENU SELECTED?
1007 ORGANIZATION MENU PROCESS
1008 IS LIST DISPLAY SELECTED?
1009 LIST DISPLAY PROCESS
FIG. 28
ORGANIZATION NETWORK PROCESS
1101 DISPLAY ORGANIZATION NETWORK SCREEN
1102 IS "USER LIST" SELECTED?
1103 READ USER TABLE
1104 DISPLAY LIST OF USERS RELATING TO ORGANIZATION ID WHICH IS THE SAME AS ORGANIZATION ID OF LOGGED IN ORGANIZATION
1105 IS "ADVISER LIST" SELECTED?
1106 READ ADVISER TABLE
1107 DISPLAY LIST OF ADVISERS RELATING TO ORGANIZATION ID WHICH IS THE SAME AS ORGANIZATION ID OF LOGGED IN ORGANIZATION
1108 IS ADVISER ADDITION INSTRUCTED?
1109 ADVISER ADDITION PROCESS
FIG. 29
1201 IS "GROUP" SELECTED?
1202 READ GROUP TABLE
1203 DISPLAY LIST OF GROUPS RELATING TO ORGANIZATION ID WHICH IS THE SAME AS ORGANIZATION ID OF LOGGED IN ORGANIZATION
1204 IS GROUP ADDITION INSTRUCTED?
1205 INPUT GROUP
1206 READ GROUP USER TABLE
1207 EXTRACT USER ID FOR WHICH GROUP ID IS DESIGNATED GROUP ID AND APPROVAL STATUS IS "DISAPPROVED"
1208 READ USER TABLE
1209 DISPLAY LIST OF USERS FOR WHICH USER ID IS THE SAME AS EXTRACTED USER ID
1210 IS USER APPROVED?

1211 UPDATE GROUP USER TABLE
1212 GROUP ADDITION PROCESS
FIG. 30
NEW USER REGISTRATION PROCESS
1301 INPUT REGISTRATION INFORMATION
1302 PROVISIONAL REGISTRATION
1303 CONFIRMATION USING E-MAIL
1304 INPUT APPROVAL APPLICATION
1305 GENERATE RECORD IN USER TABLE
1306 REGISTER APPROVAL STATUS AS "DISAPPROVED" IN GROUP USER TABLE
1307 READ ADVISER TABLE
1308 RETRIEVE RECORD CORRESPONDING TO INPUT ORGANIZATION ID AND GROUP ID
1309 TRANSMIT E-MAIL TO CORRESPONDING ADVISER
1310 ADVISER APPROVED?
1311 REGISTER APPROVAL STATUS AS "APPROVED" IN GROUP USER TABLE
1312 TRANSMIT RESULT TO USER USING E-MAIL
FIG. 31
GENERAL USER PROCESS
1401 DISPLAY GENERAL USER DASHBOARD
1402 IS "HOME" SELECTED?
1403 HOME PROCESS
1404 IS NETWORK PROCESS SELECTED?
1405 GENERAL USER NETWORK PROCESS
1406 IS RETRIEVAL PROCESS SELECTED?
1407 RETRIEVAL PROCESS
1408 IS "MESSAGE" SELECTED?
1409 MESSAGE PROCESS
1410 IS MENU SELECTED?
1411 IS ACTIVITY RECORD SELECTED?
1412 ACTIVITY RECORD PROCESS
1413 IS PORTFOLIO SELECTED?
1414 PORTFOLIO PROCESS
1415 IS TASK SELECTED?
1416 TASK PROCESS
FIG. 32
HOME PROCESS
1501 READ FOLLOW TABLE
1502 EXTRACT USER ID TO BE FOLLOWED WHICH IS THE SAME AS LOG-IN USER ID
1503 READ RECORD OF USER ID EXTRACTED FROM ACTIVITY TABLE
1504 READ ACTIVITY EVALUATION TABLE
1505 ADD UP THE NUMBER OF RECORDS FOR EACH ACTIVITY SERIAL NUMBER
1506 READ RECORD OF USER ID EXTRACTED FROM PORTFOLIO TABLE
1507 READ PORTFOLIO EVALUATION TABLE
1508 ADD UP THE NUMBER OF RECORDS FOR EACH PORTFOLIO NUMBER
1509 DISPLAY WALL FROM NEWEST TO OLDEST FOR EXTRACTED RECORD
1510 IS DISPLAY PORTION CLICKED?
1511 DISPLAY DETAILED CONTENT OF CORRESPONDING RECORD
FIG. 33
MESSAGE PROCESS
1601 READ CHAT ROOM TABLE
1602 READ USER TABLE
1603 READ RECORD IN WHICH USER ID IS THE SAME AS CREATED USER ID
1604 DISPLAY LIST OF CHAT ROOMS FOR EACH USER ID
1605 IS ROOM ENTRANCE INSTRUCTED?
1606 GENERATE RECORD FOR EACH CHAT ROOM TABLE
1607 STORE CHAT CONTENT IN CHAT MESSAGE TABLE
1608 DISPLAY MESSAGE IN BALLOON
1609 IS ROOM EXIT INSTRUCTED?
1610 RECORD ROOM EXIT IN CORRESPONDING RECORD OF CHAT ROOM TABLE
FIG. 34
ACTIVITY RECORD PROCESS
1701 READ USER TABLE
1702 READ ACTIVITY TABLE
1703 DISPLAY ACTIVITY RECORD SCREEN
1704 IS PROFILE EDITING INSTRUCTED?
1705 IS BASIC INFORMATION EDITING INSTRUCTED?
1706 UPDATE USER TABLE BASED ON INPUT BASIC INFORMATION
1707 IS OTHER INFORMATION EDITING INSTRUCTED?
1708 UPDATE USER TABLE BASED ON INPUT INFORMATION
1709 IS ACTIVITY RECORD EDITING INSTRUCTED?
1710 UPDATE ACTIVITY TABLE BASED ON INPUT ACTIVITY INFORMATION
1711 IS PORTFOLIO EDITING INSTRUCTED?
1712 PORTFOLIO PROCESS
FIG. 35
PORTFOLIO PROCESS
1801 READ USER TABLE
1802 READ PORTFOLIO TABLE
1803 READ ACTIVITY TABLE
1804 DISPLAY PORTFOLIO SCREEN
1805 IS PORTFOLIO REGISTRATION AND EDITING INSTRUCTED?
1806 PORTFOLIO REGISTRATION AND EDITING PROCESS
1807 IS PORTFOLIO READING INSTRUCTED?
1808 DISPLAY SELECTED PORTFOLIO
1809 IS CREATION OF URL FOR SHARING INSTRUCTED?
1810 CREATE URL FOR SHARING
1811 IS PORTFOLIO PRINTING INSTRUCTED?
1812 PORTFOLIO PRINTING PROCESS
1813 IS ON-LINE APPLICATION INSTRUCTED?
1814 ON-LINE APPLICATION PROCESS
FIG. 36
PORTFOLIO REGISTRATION AND EDITING PROCESS
1901 IS BASIC INFORMATION EDITING INSTRUCTED?
1902 IS LAYOUT SELECTION INSTRUCTED?
1903 APPLY SELECTED LAYOUT
1904 IS OUTPUT FORMAT SELECTION INSTRUCTED?
1905 APPLY SELECTED FORMAT
1906 IS DISCLOSURE RANGE SELECTION INSTRUCTED?
1907 APPLY SELECTED DISCLOSURE RANGE
1908 IS ACTIVITY RECORD SELECTION INSTRUCTED?
1909 SET ACTIVITY RECORD EXTRACTION CONDITIONS
1910 EXTRACT AND DISPLAY ACTIVITY RECORD
1911 SELECT ACTIVITY RECORD AND EDIT ORDER THEREOF
1912 IS EDITING COMPLETED?
1913 STORE RESULT IN PORTFOLIO TABLE

FIG. 37
PORTFOLIO PRINTING PROCESS
2001 IS COVER PRINTING INSTRUCTED?
2002 COVER PRINTING
2003 IS TABLE OF CONTENTS PRINTING INSTRUCTED?
2004 TABLE OF CONTENTS PRINTING
2005 IS ACTIVITY RECORD PRINTING INSTRUCTED?
2006 ACTIVITY RECORD PRINTING
2007 IS BATCH WRITE-OUT INSTRUCTED?
2008 BATCH WRITE-OUT
FIG. 38
ON-LINE APPLICATION PROCESS
2101 SELECT SUBMISSION DESTINATION
2102 DO PASSWORDS MATCH?
2103 CONFIRM CONNECTION TO SUBMISSION DESTINATION SERVER
2104 TRANSMIT SELECTED PORTFOLIO
2105 IS RECEIPT RECEIVED?
2106 DISPLAY TRANSMISSION COMPLETION ON SCREEN
2107 DISCONNECTION FROM SUBMISSION DESTINATION SERVER
2108 ERROR PROCESS
FIG. 39
TASK PROCESS
2201 READ TASK RECEPTION TABLE
2202 EXTRACT RECORD OF USER ID WHICH IS THE SAME AS LOG-IN USER ID
2203 DISPLAY LIST OF EXTRACTED TASKS
2204 IS TASK SELECTED?
2205 READ TASK TABLE
2206 DISPLAY DETAILS OF TASK
2207 IS REPLY TO TASK INSTRUCTED?
2208 INPUT REPLY AND ATTACHMENT FILE
2209 IS TRANSMISSION INSTRUCTED?
2210 STORE REPLY IN TASK REPLY TABLE
2211 IS REGISTRATION OF REPLY INACTIVITY RECORD INSTRUCTED?
2212 STORE ACTIVITY RECORD IN ACTIVITY TABLE
FIG. 40
4002 650 USERS
4003 232 ADVISERS
4004 189 GROUPS
4005 54 CORPORATIONS
4006 HOME
4007 NETWORK
4008 RETRIEVAL
4009 MENU
FIG. 41
4101 NETWORK
4102 -- NAME
   -- HIGH SCHOOL/--COURSE
4103 FOLLOWER
4104 FOLLOWING
4105 ADVISER
4106 GROUP
4107 --NAME
--HIGH SCHOOL/--COURSE
FIG. 42
4202 TASK LIST
4202 NON-TRANSMISSION
4203 TRANSMITTED
4204 DRAFT
4205
LATER-TERM INDIVIDUAL PRESENTATION (ENGLISH DOCUMENT)
PLEASE SUBMIT ENGLISH DOCUMENT.
DEADLINE
SUBMISSION TARGET: GRADE 1, GROUP A
4206 18 AMONG 40 PEOPLE
REMAINDER 10 DAYS
FIG. 43
4301 TASK DETAILS
LATER-TERM INDIVIDUAL PRESENTATION (ENGLISH DOCUMENT)
PLEASE SUBMIT ENGLISH DOCUMENT.
DEADLINE
SUBMISSION TARGET: GRADE 1, GROUP A
TASK TRANSMITTER: --NAME
SUBMITTED
4303 18 AMONG 40 PEOPLE
REMAINDER 10 DAYS
4304 --NAME
--HIGH SCHOOL/--COURSE
SUBMISSION DATE
NON-SUBMISSED
FIG. 44
4401 TASK REGISTRATION/EDITING
TASK TRANSMISSION DESTINATION
4402 --NAME
   --HIGH SCHOOL/--COURSE
4403 TASK DETAILS
LATER-TERM INDIVIDUAL PRESENTATION (ENGLISH DOCUMENT)
PLEASE SUBMIT ENGLISH DOCUMENT.
DEADLINE
SUBMISSION TARGET: GRADE 1, GROUP A
TASK TRANSMITTER: --NAME
ATTACHMENT FILE
TRANSMISSION DATE AND TIME
4404 DELETE
4405 TRANSMIT
FIG. 45
4502 650 USERS
4503 232 ADVISERS
4504 189 GROUPS
4505 54 CORPORATIONS
4506 HOME
4507 NETWORK
4508 RETRIEVAL
4509 MESSAGE
4510 MENU
FIG. 46
4601 MESSAGE
4602 --NAME
--HIGH SCHOOL/--COURSE
MESSAGE: I TRANSMITTED DOCUMENT.
FIG. 47
--NAME
4702 I TRANSMITTED DOCUMENT.
4703 --NAME
--HIGH SCHOOL/--COURSE
4704 THANK YOU.
FIG. 48
4801 HOME
DURING LOG-IN MR./MRS. -NAME
4804 ADD ACTIVITY RECORD
--(NAME) ADDED NEW PORTFOLIO FOR "--COLLEGE".
4 HOURS AGO
COMMENT
4806 HOME
4807 NETWORK

4808 RETRIEVAL
4809 MESSAGE
4810 MENU
FIG. 49
4901 ACTIVITY RECORD
4902 --NAME
--HIGH SCHOOL/--COURSE
FOLLOWER
FOLLOWING
FOLLOW
PROFILE
ACTIVITY RECORD
PORTFOLIO
4903 --NAME
I PARTICIPATED IN LOCAL VOLUNTEER WORK.
COMMENT
FIG. 50
5001 ACTIVITY RECORD (REGISTRATION/EDITING)
5002 TITLE
TAG
IMPORTANCE
5003 TEXT
5004 IMAGE FILE
ATTACHMENT FILE
REFERENCE
5005 DATE
DISCLOSURE RANGE
5006 REGISTER
FIG. 51
5101 PORTFOLIO (LIST)
5102 --NAME
--HIGH SCHOOL/--COURSE
FOLLOWER
FOLLOWING
FOLLOW
PROFILE
ACTIVITY RECORD
PORTFOLIO
5103 SORT
PORTFOLIO: --COLLEGE
COMMENT
FIG. 52
5201 PORTFOLIO (REGISTRATION/EDITING)
5202 BASIC INFORMATION
5203 ACTIVITY RECORD
TITLE
COVER IMAGE
REFERENCE
5204 LAYOUT TYPE A, TYPE B, TYPE C
5205 OUTPUT FORMAT
RESUME
SUBMISSION TO COLLEGE (DOMESTIC COLLEGE)
SUBMISSION TO COLLEGE (UCA)
5206 DISCLOSURE RANGE
IMPORTANCE
5207 DELETE
5208 DETERMINE
FIG. 53
5301 PORTFOLIO (REGISTRATION/EDITING)
TITLE
FOR -- COLLEGE
5302 BASIC INFORMATION
5305 ACTIVITY RECORD
5306 DELETE
5305 I PARTICIPATED IN LOCAL VOLUNTEER WORK.
I TOOK SECOND LEVEL IN ENGLISH.
5308 RETURN
5309 DETERMINE
FIG. 54
PRINTING EDITING
TITLE FOR --COLLEGE
5402 --NAME
--HIGH SCHOOL/--COURSE
FOLLOWER
FOLLOWING
FOLLOW
I WANT TO BECOME A PERSON WHO CAN CONTRIBUTE TO A LOCAL SOCIETY THROUGH LOCAL ACTIVITIES.
5403 LOCAL ACTIVITY IN 2016
5404 DELETE
5405 EDIT
I PARTICIPATED IN LOCAL VOLUNTEER WORK.
I PARTICIPATED IN CLEANING ACTIVITY IN Mt. FUJI AS A VOLUNTEER.
5407 DELETE
5408 EDIT
5409 CONTRIBUTION TO OTHER SNS
5410 GENERATE URL FOR SHARING

The invention claimed is:

1. A portfolio creation system that creates a portfolio from an activity record, comprising:
a database server configured to maintain:
an adviser table that stores (i) information about an adviser who is appointed to determine whether a user, who is not the adviser, is approved or disapproved for registration with the portfolio creation system, and (ii) an adviser ID, which is uniquely assigned to the adviser;
an approval storage table that stores an approval of the registration of the user which is determined by the adviser in response to an approval request;
a user table that stores information about the user; and
an activity table that stores the activity record, which is a record of an activity of the user; and
a control unit configured to:
transmit the approval request to the adviser;
upon receipt of a response to the approval request, prohibit the user from using the portfolio creation system if the user is not approved or allow the user to use the portfolio creation system if the user is approved;
transmit the activity record to a user terminal on which the activity record is displayed according to a format selected by the user; and
create the portfolio based on the information about the user and the activity record.

2. The portfolio creation system according to claim 1, wherein
the database server is further configured to maintain an activity evaluation table that stores an evaluation of the activity record provided by a second user who is different from the user and the adviser, and
the control unit is further configured to transmit the evaluation to the user terminal on which the evaluation is displayed according to a format selected by the user.

3. The portfolio creation system according to claim 1, wherein the control unit is further configured to:
launch a chat room in response to a first input by the user;
perform an exchange of a message in the chat room in response to a second input by the user;
transmit the message such that the message is displayed together with the information about the user; and transmit the activity record of the user in response to a third input made on the information about the user.

4. The portfolio creation system according to claim 1, wherein the control unit is further configured to retrieve the portfolio in response to a user input.

* * * * *